United States Patent
Schjerven, Sr. et al.

(10) Patent No.: US 9,609,981 B2
(45) Date of Patent: Apr. 4, 2017

(54) APPARATUS AND METHOD FOR CONTROLLING A CONVEYOR OVEN

(71) Applicant: The Middleby Corporation, Elgin, IL (US)

(72) Inventors: William S. Schjerven, Sr., Schaumburg, IL (US); John H. Wiker, Lockport, IL (US); Richard H. Van Camp, Aurora, IL (US); Theodore James Chmiola, Carpentersville, IL (US); Mark A. Sieron, Arlington Heights, IL (US)

(73) Assignee: THE MIDDLEBY CORPORATION, Elgin, IL (US)

( * ) Notice: Subject to any disclaimer, the term of this patent is extended or adjusted under 35 U.S.C. 154(b) by 310 days.

(21) Appl. No.: 14/469,192

(22) Filed: Aug. 26, 2014

(65) Prior Publication Data
US 2014/0360382 A1    Dec. 11, 2014

Related U.S. Application Data

(63) Continuation of application No. 12/785,050, filed on May 21, 2010, now Pat. No. 8,839,714, which is a
(Continued)

(51) Int. Cl.
*A47J 37/00* (2006.01)
*A47J 37/04* (2006.01)
(Continued)

(52) U.S. Cl.
CPC ............. *A47J 37/044* (2013.01); *A21B 1/245* (2013.01); *A47J 27/62* (2013.01); *A47J 37/045* (2013.01); *Y02P 60/83* (2015.11)

(58) Field of Classification Search
CPC .......... A47J 37/044; A21B 1/245; A21B 1/48; A21B 1/26
(Continued)

(56) References Cited

U.S. PATENT DOCUMENTS

| 1,294,999 A | 2/1919 | Brickman |
| 2,051,401 A | 8/1936 | Winterstein |

(Continued)

FOREIGN PATENT DOCUMENTS

| AU | 2098970 | 6/1971 |
| DE | 3536008 | 4/1987 |

(Continued)

OTHER PUBLICATIONS

U.S. Patent and Trademark Final Office Action, received for U.S. Appl. No. 13/179,309, mailed Oct. 6, 2014.
(Continued)

*Primary Examiner* — Reginald L Alexander
(74) *Attorney, Agent, or Firm* — Michael Best & Friedrich LLP

(57) ABSTRACT

A conveyor oven includes a controller configured to change the operation of a first set of burners and a second set of burners from a cooking mode to an energy saving mode based at least in part upon detection of the absence of food in the oven chamber. The first set of burners operating at a first intensity during the cooking mode and are off during the energy saving mode. The second set of burners operating at a first intensity during the cooking mode and being adjustable to a different intensity during the energy saving mode, where the second set of burners produce heat during the different intensity.

8 Claims, 24 Drawing Sheets

Related U.S. Application Data continuation-in-part of application No. 12/550,034, filed on Aug. 28, 2009, now abandoned.

(51) Int. Cl.
*A21B 1/24* (2006.01)
*A47J 27/62* (2006.01)

(58) Field of Classification Search
USPC ..... 99/476, 477, 474, 478, 479, 468, 443 C, 99/443 R, 300
See application file for complete search history.

(56) References Cited

U.S. PATENT DOCUMENTS

| | | |
|---|---|---|
| 2,139,344 A | 12/1938 | Andersen |
| 2,340,354 A | 2/1944 | Wells |
| 2,625,992 A | 1/1953 | Vernon |
| 2,655,096 A | 10/1953 | Ebin |
| 2,939,524 A | 6/1960 | Hillebrand et al. |
| 3,154,004 A | 10/1964 | Huck |
| 3,162,430 A | 12/1964 | Wilkerson |
| 3,171,346 A | 3/1965 | Lannert et al. |
| 3,173,357 A | 3/1965 | Nunnery |
| 3,182,166 A | 5/1965 | Helmut et al. |
| 3,266,442 A | 8/1966 | Udall et al. |
| 3,294,011 A | 12/1966 | Brunson et al. |
| 3,329,506 A | 7/1967 | Smith, Jr. |
| 3,338,154 A | 8/1967 | Gomez |
| 3,403,670 A | 10/1968 | Mutchler |
| 3,417,742 A | 12/1968 | Perl |
| 3,440,975 A | 4/1969 | Beuker |
| 3,469,567 A | 9/1969 | Bergquist |
| 3,486,694 A | 12/1969 | Henson |
| 3,547,099 A | 12/1970 | McArthur, Jr. |
| 3,570,391 A | 3/1971 | Rejler |
| 3,580,164 A | 5/1971 | Baker |
| 3,589,848 A | 6/1971 | Potts |
| 3,617,159 A | 11/1971 | Arndt |
| 3,646,880 A | 3/1972 | Norris |
| 3,694,137 A | 9/1972 | Fichter et al. |
| 3,721,805 A | 3/1973 | Barratt |
| 3,749,546 A | 7/1973 | Reed et al. |
| 3,861,854 A | 1/1975 | Walbridge |
| 3,941,553 A | 3/1976 | Bedford |
| 3,943,910 A | 3/1976 | White |
| 3,993,788 A | 11/1976 | Longenecker |
| 4,055,677 A | 10/1977 | White |
| 4,088,436 A | 5/1978 | Alferes |
| 4,131,412 A | 12/1978 | Matthews |
| 4,154,861 A | 5/1979 | Smith |
| 4,176,589 A | 12/1979 | Stuck |
| 4,188,868 A | 2/1980 | Baker et al. |
| 4,189,680 A | 2/1980 | Clark |
| 4,195,558 A | 4/1980 | Speakman |
| 4,201,924 A | 5/1980 | Uram |
| 4,204,830 A | 5/1980 | Jones et al. |
| 4,228,730 A | 10/1980 | Schindler et al. |
| 4,229,157 A | 10/1980 | Ito et al. |
| 4,242,079 A | 12/1980 | Matthews |
| 4,245,978 A | 1/1981 | del Valle |
| 4,252,300 A | 2/1981 | Herder |
| 4,281,358 A | 7/1981 | Plouffe et al. |
| 4,297,942 A | 11/1981 | Benson et al. |
| 4,321,857 A | 3/1982 | Best |
| 4,337,893 A | 7/1982 | Flanders et al. |
| 4,359,315 A | 11/1982 | Matthews |
| 4,377,109 A | 3/1983 | Brown et al. |
| 4,389,562 A | 6/1983 | Chaudoir |
| 4,403,942 A | 9/1983 | Copenhaver |
| 4,421,015 A | 12/1983 | Masters et al. |
| 4,438,572 A | 3/1984 | Kaminski |
| 4,446,358 A | 5/1984 | Comerford et al. |
| 4,457,291 A | 7/1984 | Henke |
| 4,462,383 A | 7/1984 | Henke et al. |
| 4,474,498 A | 10/1984 | Smith |
| 4,479,776 A | 10/1984 | Smith |
| 4,492,839 A | 1/1985 | Smith |
| 4,499,368 A | 2/1985 | Payne |
| 4,508,025 A | 4/1985 | Schultz |
| 4,516,012 A | 5/1985 | Smith et al. |
| 4,517,447 A | 5/1985 | Hicks |
| 4,519,771 A | 5/1985 | Six et al. |
| 4,554,437 A | 11/1985 | Wagner et al. |
| 4,569,328 A | 2/1986 | Shukla et al. |
| 4,569,658 A | 2/1986 | Wiggins et al. |
| 4,576,090 A | 3/1986 | Burtea |
| 4,601,743 A | 7/1986 | Canfield |
| 4,610,886 A | 9/1986 | Buller-Colthurst |
| 4,614,491 A | 9/1986 | Welden |
| 4,615,014 A | 9/1986 | Gigandet et al. |
| 4,615,282 A | 10/1986 | Brown |
| 4,626,661 A | 12/1986 | Henke |
| 4,662,838 A | 5/1987 | Riordan |
| 4,671,250 A | 6/1987 | Hurley et al. |
| 4,676,151 A | 6/1987 | Gorsuch et al. |
| 4,681,084 A | 7/1987 | Grech |
| 4,700,685 A | 10/1987 | Miller |
| 4,701,340 A | 10/1987 | Bratton et al. |
| 4,716,820 A | 1/1988 | Stuck |
| 4,739,154 A | 4/1988 | Bharara et al. |
| 4,749,581 A | 6/1988 | Gorsuch et al. |
| 4,750,276 A | 6/1988 | Smith et al. |
| 4,753,215 A | 6/1988 | Kaminski et al. |
| 4,757,800 A | 7/1988 | Shei et al. |
| 4,760,911 A | 8/1988 | Bacigalupe et al. |
| 4,781,169 A | 11/1988 | Henke et al. |
| 4,787,842 A | 11/1988 | Stewart et al. |
| 4,792,303 A | 12/1988 | Stewart et al. |
| 4,798,531 A | 1/1989 | Breckner |
| 4,834,063 A | 5/1989 | Hwang et al. |
| 4,835,351 A | 5/1989 | Smith et al. |
| 4,846,143 A | 7/1989 | Csadenyi |
| 4,846,647 A | 7/1989 | Stewart et al. |
| 4,881,519 A | 11/1989 | Henke |
| 4,882,981 A | 11/1989 | Bacigalupe et al. |
| 4,884,552 A | 12/1989 | Wells et al. |
| 4,886,044 A | 12/1989 | Best |
| 4,922,861 A | 5/1990 | Tsutsui et al. |
| 4,924,763 A | 5/1990 | Bingham |
| 4,928,663 A | 5/1990 | Nevin et al. |
| 4,941,819 A | 7/1990 | Stewart et al. |
| 4,951,648 A | 8/1990 | Shukla et al. |
| 4,963,375 A | 10/1990 | Sato et al. |
| 4,964,392 A | 10/1990 | Bruno et al. |
| 4,981,416 A | 1/1991 | Nevin et al. |
| 5,012,071 A | 4/1991 | Henke |
| 5,013,563 A | 5/1991 | Stuck |
| 5,016,606 A | 5/1991 | Himmel et al. |
| 5,025,775 A | 6/1991 | Crisp |
| 5,033,366 A | 7/1991 | Sullivan |
| 5,045,658 A | 9/1991 | Smith |
| 5,078,050 A | 1/1992 | Smith |
| 5,112,630 A | 5/1992 | Scott |
| 5,131,841 A | 7/1992 | Smith et al. |
| 5,134,263 A | 7/1992 | Smith et al. |
| 5,147,994 A | 9/1992 | Smith et al. |
| 5,154,160 A | 10/1992 | Burtea et al. |
| 5,161,889 A | 11/1992 | Smith et al. |
| 5,179,265 A | 1/1993 | Sheridan et al. |
| 5,189,944 A | 3/1993 | Rasmussen et al. |
| 5,197,375 A | 3/1993 | Rosenbrock et al. |
| 5,205,274 A | 4/1993 | Smith et al. |
| 5,210,387 A | 5/1993 | Smith et al. |
| 5,234,196 A | 8/1993 | Harris |
| 5,249,739 A | 10/1993 | Bartels et al. |
| 5,253,564 A | 10/1993 | Rosenbrock et al. |
| 5,257,574 A | 11/1993 | Hiromichi |
| 5,263,851 A | 11/1993 | Hosome et al. |
| 5,276,978 A | 1/1994 | Hopkins et al. |
| 5,277,105 A | 1/1994 | Bruno et al. |
| RE34,541 E | 2/1994 | Kreiger |
| 5,289,500 A | 2/1994 | Inou et al. |
| 5,310,978 A | 5/1994 | Smith et al. |

(56) References Cited

U.S. PATENT DOCUMENTS

| | | |
|---|---|---|
| 5,321,229 A | 6/1994 | Holling et al. |
| 5,351,416 A | 10/1994 | Witkin |
| 5,361,749 A | 11/1994 | Smith et al. |
| 5,365,918 A | 11/1994 | Smith et al. |
| 5,368,476 A | 11/1994 | Sugahara et al. |
| 5,379,752 A | 1/1995 | Virgil, Jr. et al. |
| 5,398,666 A | 3/1995 | Smith et al. |
| 5,401,940 A | 3/1995 | Smith et al. |
| 5,404,808 A | 4/1995 | Smith et al. |
| 5,431,181 A | 7/1995 | Saadi et al. |
| 5,449,888 A | 9/1995 | Smith et al. |
| 5,452,709 A | 9/1995 | Mealer |
| 5,454,295 A | 10/1995 | Cox et al. |
| 5,470,018 A | 11/1995 | Smith |
| 5,471,972 A | 12/1995 | Corliss, II et al. |
| 5,473,975 A | 12/1995 | Bruno et al. |
| 5,492,055 A | 2/1996 | Nevin et al. |
| 5,500,508 A | 3/1996 | Gerl |
| 5,509,403 A | 4/1996 | Kahlke et al. |
| 5,510,601 A | 4/1996 | Smith et al. |
| 5,512,312 A | 4/1996 | Forney et al. |
| 5,520,533 A | 5/1996 | Vrolijk |
| 5,539,187 A | 7/1996 | Smith et al. |
| 5,547,373 A | 8/1996 | Snell |
| 5,558,010 A | 9/1996 | Shelton |
| 5,560,952 A | 10/1996 | Miller et al. |
| 5,568,802 A | 10/1996 | Buday et al. |
| 5,582,758 A | 12/1996 | Smith et al. |
| 5,609,095 A | 3/1997 | Lemke et al. |
| 5,630,408 A | 5/1997 | Versluis |
| 5,655,511 A | 8/1997 | Prabhu et al. |
| 5,671,660 A | 9/1997 | Moshonas |
| 5,676,044 A | 10/1997 | Lara, Jr. |
| 5,676,870 A | 10/1997 | Wassman et al. |
| 5,686,004 A | 11/1997 | Schneider |
| 5,704,278 A | 1/1998 | Cross |
| 5,717,192 A | 2/1998 | Dobie et al. |
| 5,724,244 A | 3/1998 | Yabuki |
| 5,786,566 A | 7/1998 | Miller et al. |
| 5,795,145 A | 8/1998 | Manning et al. |
| 5,818,014 A | 10/1998 | Smith et al. |
| 5,819,721 A | 10/1998 | Carr et al. |
| 5,821,503 A | 10/1998 | Witt |
| 5,832,812 A | 11/1998 | Wolfe et al. |
| 5,864,120 A | 1/1999 | Vroom et al. |
| 5,869,810 A | 2/1999 | Reynolds et al. |
| 5,875,705 A | 3/1999 | Knost |
| 5,897,807 A | 4/1999 | Edgar et al. |
| 5,906,485 A | 5/1999 | Groff et al. |
| 5,919,039 A | 7/1999 | Shaw et al. |
| 5,937,846 A | 8/1999 | Martin et al. |
| 5,938,425 A | 8/1999 | Damrath et al. |
| 5,938,961 A | 8/1999 | Maher |
| 5,942,142 A | 8/1999 | Forney et al. |
| 5,958,274 A | 9/1999 | Dobie et al. |
| 5,964,044 A | 10/1999 | Lauersdorf et al. |
| 5,971,745 A | 10/1999 | Bassett et al. |
| 5,975,072 A | 11/1999 | Garceau et al. |
| 5,997,924 A | 12/1999 | Olander, Jr. et al. |
| 5,997,930 A | 12/1999 | Kendall et al. |
| 6,000,933 A | 12/1999 | Frederick, Sr. |
| 6,018,466 A | 1/2000 | Lucian |
| 6,026,036 A | 2/2000 | Sekiya et al. |
| 6,037,580 A | 3/2000 | Renk |
| 6,062,245 A | 5/2000 | Berglind et al. |
| 6,080,972 A | 6/2000 | May |
| 6,082,251 A | 7/2000 | Kendall et al. |
| 6,091,055 A | 7/2000 | Naka et al. |
| 6,114,666 A | 9/2000 | Best |
| 6,116,895 A | 9/2000 | Onuschak |
| 6,121,593 A | 9/2000 | Mansbery et al. |
| 6,123,063 A | 9/2000 | Boerjes |
| 6,131,559 A | 10/2000 | Norris et al. |
| 6,141,967 A | 11/2000 | Angel et al. |
| 6,149,065 A | 11/2000 | White et al. |
| 6,157,002 A | 12/2000 | Schjerven, Sr. et al. |
| 6,157,014 A | 12/2000 | Goranson |
| 6,171,630 B1 | 1/2001 | Stanger et al. |
| 6,179,212 B1 | 1/2001 | Banko |
| 6,216,683 B1 | 4/2001 | Maughan |
| 6,217,312 B1 | 4/2001 | Levinson et al. |
| 6,227,189 B1 | 5/2001 | Dougherty |
| 6,250,296 B1 | 6/2001 | Norris et al. |
| 6,252,201 B1 | 6/2001 | Nevarez |
| 6,369,360 B1 | 4/2002 | Cook |
| 6,389,960 B1 | 5/2002 | Williams et al. |
| 6,408,223 B1 | 6/2002 | Skyum et al. |
| 6,453,984 B1 | 9/2002 | Liebermann et al. |
| 6,462,319 B1 | 10/2002 | Uy et al. |
| 6,481,433 B1 | 11/2002 | Schjerven, Sr. et al. |
| 6,481,999 B2 | 11/2002 | Knost |
| 6,526,961 B1 | 3/2003 | Hardenburger |
| 6,539,934 B2 | 4/2003 | Moshonas et al. |
| 6,552,309 B1 | 4/2003 | Kish et al. |
| 6,576,874 B2 | 6/2003 | Zapata et al. |
| 6,592,364 B2 | 7/2003 | Zapata et al. |
| 6,624,396 B2 | 9/2003 | Witt et al. |
| 6,630,650 B2 | 10/2003 | Bassill et al. |
| 6,638,553 B2 | 10/2003 | Bell et al. |
| 6,655,373 B1 | 12/2003 | Wiker |
| 6,684,657 B1 | 2/2004 | Dougherty |
| 6,684,875 B1 | 2/2004 | Schjerven, Sr. et al. |
| 6,707,014 B1 | 3/2004 | Corey et al. |
| 6,723,961 B2 | 4/2004 | Choat et al. |
| 6,730,890 B2 | 5/2004 | Kish et al. |
| 6,799,712 B1 | 10/2004 | Austen et al. |
| 6,805,112 B2 | 10/2004 | Cole et al. |
| 6,810,794 B2 | 11/2004 | Murthy et al. |
| 6,817,283 B2 | 11/2004 | Jones et al. |
| 6,860,734 B2 | 3/2005 | Zia et al. |
| 6,872,919 B2 | 3/2005 | Wakefield et al. |
| 6,904,903 B1 | 6/2005 | Vroom |
| 6,920,820 B2 | 7/2005 | Meggison et al. |
| 6,922,522 B2 | 7/2005 | Wang et al. |
| 6,933,473 B2 | 8/2005 | Henke et al. |
| 6,943,321 B2 | 9/2005 | Carbone et al. |
| 6,951,998 B2 | 10/2005 | Nanno et al. |
| 7,018,201 B1 | 3/2006 | Pierce et al. |
| 7,059,317 B2 | 6/2006 | Kobayashi |
| 7,091,452 B2 | 8/2006 | Kingdon et al. |
| 7,193,184 B1 | 3/2007 | Manning |
| 7,220,944 B2 | 5/2007 | Miller et al. |
| 7,255,100 B2 | 8/2007 | Repper et al. |
| RE39,828 E | 9/2007 | Miller et al. |
| 7,340,992 B1 | 3/2008 | Wolfe et al. |
| 7,360,533 B2 | 4/2008 | McFadden |
| 7,494,337 B2 | 2/2009 | Specht et al. |
| 7,507,938 B2 | 3/2009 | McFadden |
| 7,513,247 B2 | 4/2009 | Clauss et al. |
| 7,541,559 B2 | 6/2009 | Milz |
| 7,686,008 B2 | 3/2010 | Willett |
| 7,800,023 B2 | 9/2010 | Burtea et al. |
| 7,836,874 B2 | 11/2010 | McFadden |
| 7,836,875 B2 | 11/2010 | McFadden et al. |
| 7,851,727 B2 | 12/2010 | Burtea et al. |
| 7,886,658 B2 | 2/2011 | McFadden et al. |
| 7,946,224 B2 | 5/2011 | McFadden |
| 8,006,685 B2 | 8/2011 | Bolton et al. |
| 8,011,293 B2 | 9/2011 | McFadden et al. |
| 8,035,062 B2 | 10/2011 | McFadden et al. |
| 8,042,533 B2 | 10/2011 | Dobie et al. |
| RE43,035 E | 12/2011 | Schjerven et al. |
| 8,087,407 B2 | 1/2012 | Wiker et al. |
| 8,093,533 B2 | 1/2012 | French et al. |
| 8,113,190 B2 | 2/2012 | Dougherty |
| 8,206,147 B2 | 6/2012 | Videto et al. |
| 8,206,148 B2 | 6/2012 | Paesani |
| 8,210,844 B2 | 7/2012 | Wolfe et al. |
| 8,267,051 B2 | 9/2012 | Ando |
| 8,281,779 B2 | 10/2012 | Wiker et al. |
| 8,297,270 B2 | 10/2012 | McFadden |
| 8,371,285 B2 | 2/2013 | Wiker et al. |
| 8,413,646 B2 | 4/2013 | Wiker et al. |
| 8,418,661 B2 | 4/2013 | Kanda et al. |

(56) References Cited

U.S. PATENT DOCUMENTS

| | | | |
|---|---|---|---|
| 8,536,493 | B1 | 9/2013 | Wolfe |
| 8,563,059 | B2 | 10/2013 | Luckhardt et al. |
| 8,757,203 | B2 | 6/2014 | Cadeau et al. |
| 8,839,714 | B2 | 9/2014 | Schjerven et al. |
| 8,839,779 | B2 | 9/2014 | Wiker et al. |
| 8,863,734 | B2 | 10/2014 | Shaffer |
| 8,960,234 | B2 | 2/2015 | Cadeau et al. |
| 9,080,678 | B2 | 7/2015 | Naumann |
| 9,291,364 | B2 | 3/2016 | Okamoto et al. |
| 9,297,537 | B2 | 3/2016 | Hensley et al. |
| 2001/0038876 | A1 | 11/2001 | Anderson |
| 2001/0051107 | A1 | 12/2001 | Lochschmied |
| 2002/0013819 | A1 | 1/2002 | Lim et al. |
| 2002/0029695 | A1 | 3/2002 | Gongwer et al. |
| 2002/0046474 | A1 | 4/2002 | Novak et al. |
| 2002/0070099 | A1 | 6/2002 | Neely |
| 2003/0213371 | A1 | 11/2003 | Saunders |
| 2004/0040950 | A1 | 3/2004 | Carbone et al. |
| 2004/0187709 | A1 | 9/2004 | Murthy et al. |
| 2004/0237741 | A1 | 12/2004 | Stinnett et al. |
| 2005/0021407 | A1 | 1/2005 | Kargman |
| 2005/0109216 | A1 | 5/2005 | Jones et al. |
| 2005/0132899 | A1 | 6/2005 | Huang et al. |
| 2006/0006163 | A1 | 1/2006 | Carbone et al. |
| 2006/0096973 | A1 | 5/2006 | Powell |
| 2006/0163238 | A1 | 7/2006 | Miller et al. |
| 2007/0006865 | A1 | 1/2007 | Wiker et al. |
| 2007/0012307 | A1 | 1/2007 | Wiker et al. |
| 2007/0137633 | A1 | 6/2007 | McFadden |
| 2007/0272228 | A1 | 11/2007 | Slaby |
| 2008/0035746 | A1 | 2/2008 | Willms |
| 2008/0092754 | A1 | 4/2008 | Noman |
| 2008/0124668 | A1 | 5/2008 | Schultz et al. |
| 2008/0182214 | A1 | 7/2008 | Cox et al. |
| 2008/0216812 | A1 | 9/2008 | Dougherty |
| 2008/0245359 | A1 | 10/2008 | Williamson |
| 2008/0289619 | A1 | 11/2008 | Schjerven, Sr. et al. |
| 2009/0075224 | A1 | 3/2009 | Wiker et al. |
| 2009/0223503 | A1 | 9/2009 | Wiker et al. |
| 2010/0001087 | A1 | 1/2010 | Gum |
| 2010/0319551 | A1 | 12/2010 | Cox et al. |
| 2011/0048244 | A1 | 3/2011 | Wiker |
| 2011/0048245 | A1 | 3/2011 | Schjerven, Sr. et al. |
| 2011/0269085 | A1 | 11/2011 | Wiker et al. |
| 2012/0073558 | A1 | 3/2012 | Wiker et al. |
| 2012/0180775 | A1 | 7/2012 | Waltz et al. |
| 2013/0000628 | A1 | 1/2013 | Wiker et al. |
| 2013/0008424 | A1 | 1/2013 | Wiker et al. |
| 2013/0186387 | A1 | 7/2013 | Wiker et al. |
| 2014/0174301 | A1 | 6/2014 | Moon et al. |
| 2014/0199446 | A1 | 7/2014 | Huegerich |
| 2014/0261371 | A1 | 9/2014 | Van Camp et al. |
| 2014/0360381 | A1 | 12/2014 | Wiker et al. |
| 2015/0157171 | A1 | 6/2015 | Janecka |
| 2015/0230658 | A1 | 8/2015 | De Luca et al. |
| 2016/0195285 | A1 | 7/2016 | Gum |

FOREIGN PATENT DOCUMENTS

| | | |
|---|---|---|
| EP | 0830814 | 3/1998 |
| FR | 2454596 | 11/1980 |
| GB | 2215177 | 9/1989 |
| JP | 60062511 | 4/1985 |
| JP | 2004329107 | 11/2004 |
| WO | 01/22823 | 4/2001 |
| WO | 2004076928 | 9/2004 |
| WO | 2005023006 | 3/2005 |
| WO | 2005094647 | 10/2005 |
| WO | 2005112650 | 12/2005 |
| WO | 2006101531 | 9/2006 |
| WO | 2007050136 | 5/2007 |
| WO | 2008026031 | 3/2008 |
| WO | 2008044107 | 4/2008 |
| WO | 2010080160 | 7/2010 |
| WO | 2011025666 | 3/2011 |

OTHER PUBLICATIONS

Office Action from the United States Patent and Trademark Office for U.S. Appl. No. 13/612,522 dated Apr. 17, 2015 (11 pages).
Office Action from co-pending U.S. Appl. No. 13/793,679, dated Nov. 10, 2014, 12 pages.
Office Action from co-pending U.S. Appl. No. 13/612,522, dated Nov. 18, 2014, 11 pages.
Office Action from co-pending U.S. Appl. No. 13/793,679, dated Apr. 28, 2015, 10 pages.
Office Action from co-pending U.S. Appl. No. 12/550,034, dated May 19, 2015, 33 pages.
Office Action from co-pending U.S. Appl. No. 13/179,309, dated May 21, 2015, 20 pages.
European Communication for European Application No. 05 825 016.8, dated Sep. 12, 2014, 4 pages.
European Communication for European Application No. 05 825 016.8, dated Jan. 13, 2015, 4 pages.
European Communication for European Application No. 05 825 016.8, dated Mar. 3, 2015, 5 pages.
U.S. Patent and Trademark Non-Final Office Action for U.S. Appl. No. 13/179,309, dated Dec. 16, 2015, 21 pages.
U.S. Patent and Trademark Final Office Action, received for U.S. Appl. No. 13/612,522, mailed Nov. 25, 2015, 12 pages.
U.S. Patent and Trademark Non-Final Office Action, received for U.S. Appl. No. 13/612,522, dated Apr. 14, 2016, 10 pages.
U.S. Patent and Trademark Final Office Action for U.S. Appl. No. 131793,679, dated Nov. 27, 2015, 10 pages.
U.S. Patent and Trademark Non-Final Office Action for U.S. Appl. No. 13/793,679, dated Apr. 15, 2016, 9 pages.
U.S. Patent and Trademark Final Office Action, received for U.S Appl. No. 13/179,309, mailed Jun. 15, 2016, 21 pages.
U.S. Patent and Trademark Office Action, received for U.S. Appl. No. 14/469,058, mailed Jul. 26, 2016, 7 pages.
Bakers Pride Oven Company, Inc., APC-18 Electric Conveyor Oven (Jul. 2000).
Bakers Pride Oven Company, Inc., Model VHVA-1620E Electric Forced Air Counter Top Conveyor Ovens (Mar. 2003).
Bakers Pride Oven Company, Inc., Model VHVA-1828E Dual Air Electric Impingement Counter Top Conveyor Ovens (Jan. 2005).
Bakers Pride Oven Company, Inc., VH1620E, VHVA1620E, VH1828E & VHVA1828E Electric Counter Top Conveyor Ovens—Parts Lists & Exploded Views (May 2005).
Grainger 7.4 Electrical Diagram, 3270-TS-D Left Hand Side, XLT-3200-TS-D Installation & Operation Manual (2004) p. 48.
Grainger 7.5 Electrical Diagram, 3270-TS-D Right Hand Side, XLT-3200-TS-D Installation & Operation Manual (2004) p. 49.
Middleby Marshall, Owner's Operating & Installation Manual for Gas Oven Models, Series PS360EWB (Apr. 1996) 108 pages.
Panasonic, Ideals for Life Programmable Controller FP-X, Matsushita Electric Works, Ltd. (2005) 18 pages.
Selectra, A200 Signal Conditioner Bulletin MS2036 (Jan. 1996) Maxitrol Company, Southfield.
Selectra, AP300 Signal Conditioner Bulletin MS2036A (Mar. 2000) Maxitrol Company, Southfield.
Canadian Intellectual Property Office Action, Canadian Patent Application No. 2,625,621, mailed Mar. 5, 2010.
Canadian Intellectual Property Office Action, Canadian Application No. 2,625,621, mailed Feb. 10, 2011.
Canadian Intellectual Property Office Action, Canadian Patent Application No. 2,772,293, mailed Jul. 23, 2013.
Canadian Intellectual Property Office Action, Canadian Patent Application No. 2,783,217, mailed Dec. 9, 2013.
EP 058250168 Extended European Search Report dated May 24, 2012, 5 pages.
EP 067725648 Extended European Search Report and Written Opinion dated Mar. 6, 2012, 8 pages.
U.S. Patent and Trademark Non-Final Office Action, received for U.S. Appl. No. 10/546,104, mailed Oct. 3, 2008.
U.S. Patent and Trademark Final Office Action, received for U.S. Appl. No. 10/546,104, mailed Feb. 18, 2009.
Office Action from the U. S. Patent and Trademark Office for U.S. Appl. No. 11/526,133 dated Aug. 6, 2008.

(56) References Cited

OTHER PUBLICATIONS

Office Action from the U. S. Patent and Trademark Office for U.S. Appl. No. 11/526,133 dated Apr. 29, 2009.
Office Action from the U. S. Patent and Trademark Office for U.S. Appl. No. 11/526,133 dated Nov. 23, 2009.
Office Action from the U. S. Patent and Trademark Office for U.S. Appl. No. 11/526,133 dated Jul. 20, 2010.
U.S. Patent and Trademark Non-Final Office Action, received for U.S. Appl. No. 12/233,969, mailed Apr. 13, 2010.
U.S. Patent and Trademark Final Office Action, received for U.S. Appl. No. 12/233,969, mailed Dec. 8, 2010.
U.S. Patent and Trademark Non-Final Office Action, received for U.S. Appl. No. 12/463,051, mailed May 9, 2011.
U.S. Patent and Trademark Non-Final Office Action, received for U.S. Appl. No. 12/550,034, mailed Apr. 8, 2013.
U.S. Patent and Trademark Non-Final Office Action, received for U.S. Appl. No. 13/611,877, mailed Nov. 5, 2013.
U.S. Patent and Trademark Non-Final Office Action, received for U.S. Appl. No. 13/179,309, mailed Dec. 4, 2013.
U.S. Patent and Trademark Non-Final Office Action, received for U.S. Appl. No. 13/612,522, mailed Sep. 13, 2013.
U.S. Patent and Trademark Non-Final Office Action, received for U.S. Appl. No. 13/793,679, mailed Sep. 13, 2013.
U.S. Patent and Trademark Final Office Action, received for U.S. Appl. No. 12/550,034, mailed May 23, 2014.
U.S. Patent and Trademark Final Office Action, received for U.S. Appl. No. 13/612,522, mailed Jun. 4, 2014.
U.S. Patent and Trademark Final Office Action, received for U.S. Appl. No. 13/793,679, mailed Jun. 5, 2014.
PCT/US2005/09546 International Search Report and Written Opinion dated Sep. 2, 2005.
PCT/US2005/09546 International Preliminary Report on Patentability dated Jan. 8, 2006.
PCT/US2005/38783 International Search Report and Written Opinion dated Jun. 14, 2006.
PCT/US2005/38783 International Preliminary Report on Patentability dated Dec. 30, 2008.
PCT/US2006/22304 International Search Report and Written Opinion dated Apr. 27, 2007.
PCT/US2006/22304 International Preliminary Report on Patentability dated Dec. 3, 2007.
PCT/US2009/030727 International Search Report and Written Opinion dated Mar. 3, 2009.
PCT/US2009/30727 International Preliminary Report on Patentability dated Mar. 16, 2011.
PCT/US2010/45322 International Search Report and Written Opinion dated Oct. 7, 2010.
U.S. Patent and Trademark Non-Final Office Action, received for U.S. Appl. No. 12/785,050, mailed Jan. 28, 2013.
U.S. Patent and Trademark Non-Final Office Action, received for U.S. Appl. No. 13/612,522, mailed Oct. 14, 2016.
U.S. Patent and Trademark Non-Final Office Action, received for U.S. Appl. No. 13/793,679, mailed Oct. 17, 2016.

|  | Main Blower Speed | |
|---|---|---|
| Oven Temperature | Low | High |
| ⋮ | ⋮ | ⋮ |
| 250 | X1 | Y1 |
| 260 | X2 | Y2 |
| 270 | X3 | Y3 |
| 280 | X4 | Y4 |
| 290 | X5 | Y5 |
| 300 | X6 | Y6 |
| 310 | X7 | Y7 |
| 320 | X8 | Y8 |
| 330 | X9 | Y9 |
| 340 | X10 | Y10 |
| 350 | X11 | Y11 |
| ⋮ | ⋮ | ⋮ |

*FIG. 9*

APPARATUS AND METHOD FOR CONTROLLING A CONVEYOR OVEN

CROSS-REFERENCE TO RELATED APPLICATIONS

This application claims priority to and is a continuation of U.S. patent application Ser. No. 12/785,050, filed May 21, 2010, which claims priority to and is a continuation in-part of U.S. patent application Ser. No. 12/550,034, filed Aug. 28, 2009, the entire contents of all of which are hereby incorporated by reference.

BACKGROUND

Conveyor ovens are commonly used for cooking a wide variety of food products, such as for cooking pizzas, baking and toasting bread, and the like. Examples of such ovens are shown, for example, in International Patent Application No. PCT/2009/030727, the entire contents of which are incorporated herein by reference.

Conveyor ovens typically have metallic housings with a heated tunnel extending therethrough, and one or more conveyors running through the tunnel. Each conveyor (in the form of a conveyor belt, for example) transports food items through the heated oven tunnel at a speed calculated to properly bake food on the conveyor belt during the time the conveyor carries the food through the oven. Conveyor ovens generally include a heat delivery system that may include one or more blowers supplying heated air to the tunnel, such as from a plenum to the tunnel. In some conveyor ovens, the hot air is supplied to the tunnel through passageways that lead to metal fingers discharging air into the tunnel at locations above and/or below the conveyor. The metal fingers act as airflow channels that deliver streams of hot air which impinge upon the surfaces of the food items passing through the tunnel on the conveyor. In modern conveyor ovens, a microprocessor-driven control can be employed to enable the user to regulate the heat provided to the tunnel, the speed of the conveyor, and other parameters to properly bake the food item being transported through the oven.

Some conveyor ovens include one or more gas burners positioned to heat air (e.g., in a plenum) before it is supplied to the tunnel to heat the food. In such ovens, the gas burner can include a modulating gas valve providing fuel to the burners, and a combustion blower providing enough air for efficient combustion of the fuel. An oven controller can monitor the temperature at one or more locations within the tunnel, and can adjust the modulating gas valve to provide more or less heat to the tunnel. If the measured temperature is lower than a set point temperature, the modulating gas valve is adjusted to supply more fuel. Conversely, if the measured temperature is higher than the set point temperature, the modulating gas valve is adjusted to supply less fuel. In some conventional ovens, the combustion blower and the modulating fuel valve are adjusted proportionally. For example, if the modulating fuel valve is adjusted to double the amount of fuel output, the speed of the combustion blower is also doubled.

SUMMARY

Some embodiments of the present invention provide a conveyor oven having a cooking mode and an energy saving mode, the conveyor oven comprising an oven chamber in which food is cooked, a conveyor moveable to convey the food through the oven chamber, and a first set of one or more burners configured to generate heat for the oven chamber, wherein the first set of one or more burners is operable at a first intensity during the cooking mode and is turned off in the energy saving mode. The conveyor oven can also include a second set of one or more burners configured to generate heat for the oven chamber. The second set of one or more burners can operate at a first intensity during the cooking mode and can be variable to a different intensity in the energy saving mode in which the second set of one or more burners generates heat at the different intensity. The conveyor oven can also include a controller responsive to the absence of food in the oven chamber, with the controller being configured to change operation of the first set of one or more burners and the second set of one or more burners from the cooking mode to the energy saving mode based at least in part upon the detection of the absence of food in the oven chamber.

Some embodiments of the present invention provide a conveyor oven having a cooking mode and an energy saving mode, wherein the conveyor oven comprises an oven chamber in which food is cooked, a conveyor moveable to convey the food through the oven chamber, and a first valve configured to regulate the flow of gas to a first set of one or more burners and a second set of one or more burners. The gas flows through the first valve at a first flow rate during the cooking mode, and is variable to a different flow rate in the energy saving mode in which the first valve allows at least some gas to flow therethrough at the different flow rate. The conveyor oven can also include a second valve configured to regulate the flow of gas between the first valve and the first set of one or more burners. The gas can flow through the second valve at a first flow rate during the cooking mode and is restricted from flowing during the energy saving mode. The conveyor oven can also include a controller responsive to the absence of food in the oven chamber, wherein the controller adjusts the first valve and the second valve between the cooking mode and the energy saving mode in response to detection of the absence of food in the oven chamber.

Some embodiments of the present invention provide a conveyor oven comprising an oven chamber in which food is cooked, a conveyor moveable to convey the food through the oven chamber, and a main blower that circulates air within the oven chamber. The main blower can be operable at a first speed, a second speed slower than the first speed, and a third speed slower than the second speed. The conveyor oven can also include at least one gas burner, a combustion blower that provides air to the at least one gas burner, and a controller responsive to the absence of food in the oven chamber and the activation or increase in speed of the combustion blower. The controller can be configured to change the speed of the main blower from the first speed to the second speed based at least in part upon the detection of the absence of food in the oven chamber and is configured to change the speed of the main blower from the second speed to the third speed based at least upon the detection of the activation or increase in speed of the combustion blower.

Some embodiments of the present invention provide a conveyor oven comprising an oven chamber in which food is cooked, a conveyor moveable to convey the food through the oven chamber, and a main blower that circulates air within the oven chamber. The main blower can be operable at a first speed, a second speed slower than the first speed, and a third speed slower than the second speed. The conveyor oven can also include at least one gas burner, a gas burner airflow rate at least partially defined by the speed of the main blower, and a controller responsive to the absence of food in the oven chamber and the gas burner airflow rate. Furthermore, the controller can be able to change the speed of the main blower from first speed to the second speed based at least in part upon the detection of the absence of food in the oven chamber, and can be configured to change the speed of the main blower from the second speed to the third speed when the gas burner airflow rate exceeds a predetermined minimum.

Some embodiments of the present invention provide a conveyor oven having a cooking mode and an energy saving mode, an oven chamber in which food is cooked, a conveyor moveable to convey the food through the oven chamber, and a first set of one or more burners configured to generate heat for the oven chamber. The first set of one or more burners can be operable at a first intensity during the cooking mode, and can be turned off in the energy saving mode. The conveyor oven can also include a second set of one or more burners configured to generate heat for the oven chamber, wherein the second set of one or more burners is operable at a first intensity during the cooking mode and is variable to a different intensity in the energy saving mode, wherein a gas burner airflow rate passing through at least one of the burners of the first set of one or more burners or at least one of the burners of the second set of one or more burners is variable between the cooking mode and the energy saving mode.

Some embodiments of the present invention provide a conveyor oven having an oven chamber in which food is cooked, a conveyor moveable to convey the food through the oven chamber, at least one gas burner having a gas burner airflow rate passing therethrough, a blower that circulates air, and a damper adjustable between a first configuration and a second configuration different from the first configuration in order to adjust the gas burner airflow rate.

Other aspects of the present invention will become apparent by consideration of the detailed description and accompanying drawings.

BRIEF DESCRIPTION OF THE DRAWINGS

FIG. 9 is an example of a look-up table used to determine an appropriate speed of a combustion blower in the conveyor oven of FIG. 1.

DETAILED DESCRIPTION

Before any embodiments of the present invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
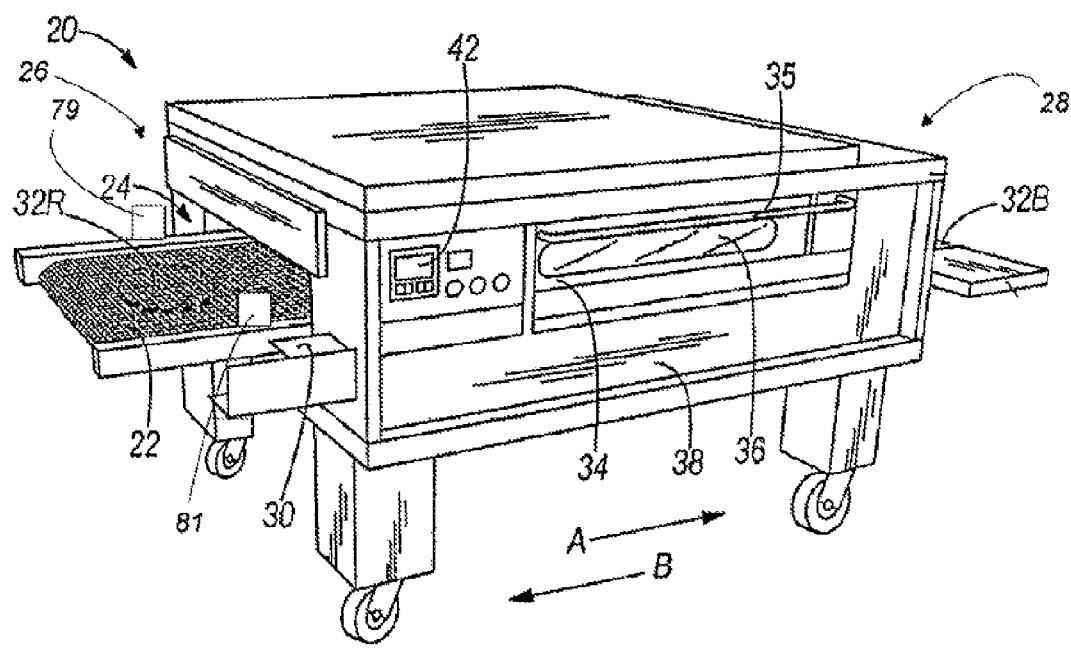
FIG. 1 is a perspective view of a conveyor oven in accordance with an embodiment of the invention.

FIG. 1 shows a conveyor oven 20 having a conveyor 22 which runs through a heated tunnel 24 of the oven. The illustrated conveyor 22 has a width generally corresponding to the width of the heated tunnel 24, and is designed to travel in direction A from left oven end 26 toward right oven end 28 or, alternatively in direction B, from right oven end 28 toward left oven end 26. Thus, oven ends 26 and 28 may serve respectively as the inlet and outlet of an oven 20 with a rightwardly moving conveyor 22 or as the outlet and inlet of an oven 20 with a leftwardly moving conveyor 22. Although the conveyor oven 20 illustrated in FIG. 1 has only a single conveyor 22, any number of additional conveyors 22 in any desired arrangement can be used in other embodiments.

In some embodiments, the oven 20 can have one or more sensors positioned to detect the presence of food product on the conveyor 22 at one or more locations along the length of the conveyor 22. By way of example only, the oven 20 illustrated in FIG. 1 has photosensors 79, 81 (see FIGS. 3 and 4) positioned at the entrance of the oven tunnel 24 to detect the presence of a food item on the conveyor 22. In other embodiments, other types of sensors (e.g., other optical sensors, mechanical sensors, temperature sensors, and the like) can be positioned at the entrance of the oven tunnel 24, at any other location upstream of the oven tunnel 24, at the exit of the oven tunnel 24, at any other location downstream of the oven tunnel 24, and/or at any location within the tunnel 24. Such sensor(s) can be connected to a controller 42 (described in greater detail below) to trigger a change in operation of the conveyor 22, such as to start, stop, increase and/or decrease the output of one or more gas burners of the oven 20, to start, stop, speed up, or slow down one or more blower fans of the oven 20, and/or start, stop, speed up or slow down the conveyor 22. In these cases, such changes can be initiated immediately upon detection of the food product at one or more locations along the conveyor 22, or can be initiated after a predetermined period of time (e.g., a programmed or otherwise set period of time) has passed.

The conveyor 22 can be implemented using conventional components and techniques such as those described in U.S. Pat. Nos. 5,277,105 and 6,481,433 and 6,655,373, the contents of which are incorporated herein by reference insofar as they relate to conveyor support, tracking, and drive systems, and related methods. In the illustrated embodiment by way of example only, a chain link drive is housed within compartment 30 at the left end 26 of the oven. Thus, a food item 32R, such as a raw pizza or a sandwich (to be toasted), may be placed on the conveyor 22 of the incoming left oven end 26, and removed from the conveyor 22 as a fully baked food item 32B at the outgoing right oven end 28. The speed at which the conveyor 22 moves is coordinated with the temperature in the heated tunnel 24 so that the emerging food item 32B is properly baked, toasted, or otherwise cooked.

A hinged door 34 is provided on the front of the oven 20 shown in FIG. 1, with a handle 35 and a heat resistant glass panel 36 permitting a person operating the oven to view a food item as it travels through the oven 20. In the illustrated embodiment, a stainless steel metal frame surrounds the oven opening, and provides a support for a gasket of suitable material (not shown), so that when the hinged door 34 is in its closed position, it fits against and compresses the gasket to retain heat in the oven 20. Also, the operator may open the door 34 by pulling on handle 35 to place a different product on the conveyor 22 if less than a full cooking cycle is required to produce a fully cooked product. A hinged oven access panel 38, open as shown in FIG. 2, provides access to internal components of the oven 20, such as gas burners 100, 150 and a combustion blower 155.

Figure 2:
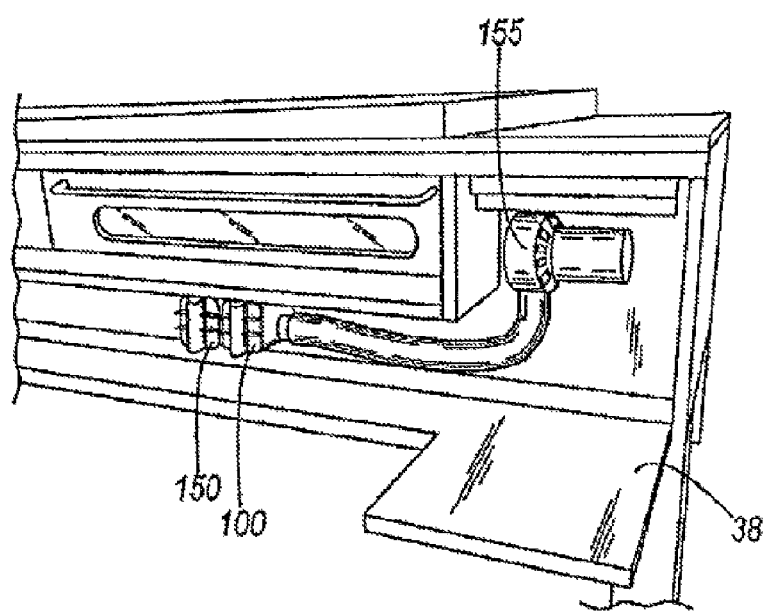
FIG. 2 is a perspective view of a portion of the conveyor oven of FIG. 1, in which a hinged oven access panel has been opened to reveal some of the internal components of the oven.
Figure 3:
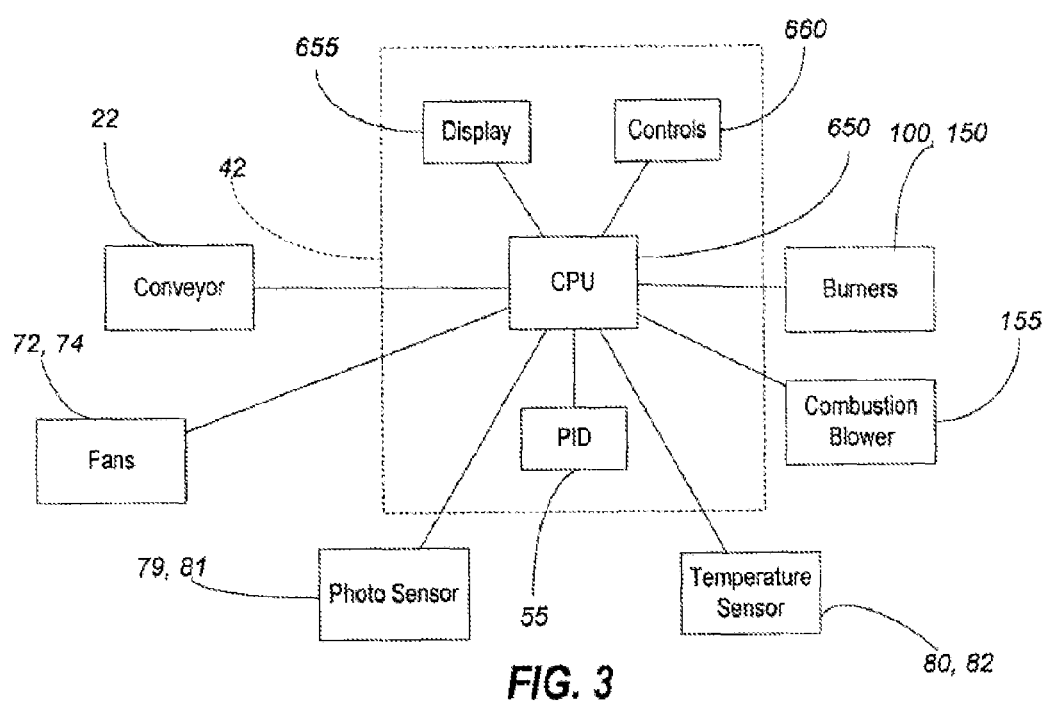
FIG. 3 is a schematic illustration of an embodiment of the control system of the conveyor oven of FIG. 1.

FIG. 3 illustrates a schematic example of a control system for the oven 20 shown in FIGS. 1 and 2. In the illustrated control system, a controller 42 includes one or more displays 655, and a control interface 660. The illustrated controller 42 also includes a central processing unit ("CPU") 650 for controlling operation of a plurality of devices, including the gas burners 100, 150, two main blower fans 72, 74, the conveyor 22, and a combustion blower 155. The CPU 650 can be in the form of a microcontroller or programmable logic controller (PLC) with an associated memory unit in which software or a set of instructions is stored, can instead be defined by a plurality of discreet logic elements, or can take any other form suitable for control of the gas burners 100, 150, main blower fans 72, 74, conveyor 22, and combustion blower 155. The illustrated CPU 650 receives input from a plurality of sensors including one or more temperature sensors 80, 82 positioned inside the oven, and one or more photosensors 79, 81 (described above). In some alternate constructions, the controller 42 may also or instead provide for manual input (e.g., via buttons, switches, or other controls operated by a user) to trigger operational change of the conveyor oven components described herein, such as to start, stop, increase the speed of, or decrease the speed of either or both main blower fans 72, 74, combustion blower 155, and/or the conveyor 22, and/or to start, stop, increase, or decrease the heat output of either or both gas burners 100, 150. Also in some embodiments, one or more of the above stated components may be adjusted directly by the user without any input from a controller 42 (in which cases the controller 42 need not necessarily exist).

Although the oven 20 illustrated in FIGS. 1-3 includes two gas burners 100, 150 and two main blower fans 72, 74, any number of gas burners 100, 150 and blower fans 72, 74 can be used in other embodiments. In those embodiments in which two or more gas burners 100, 150 and/or two or more blower fans 72, 74 are used, the CPU 650 can control operation of the gas burners 100, 150 independently with respect to one another and/or can control operation of the blower fans 72, 74 independently with respect to one another, or otherwise.

The controller 42 in the illustrated embodiment adjusts the internal temperature of the oven using a PID (proportional-integral-derivative) control module 55 (also described in greater detail below). The PID control module 55 can calculate an amount of fuel needed by the gas burners 100, 150 to raise the actual temperature toward a setpoint temperature, and the CPU 650 can generate a command or signal to an amplifier board or signal conditioner that controls a modulating fuel valve 408 (described below) to regulate the amount of fuel provided to each of the gas burners 100, 150.

Heat delivery systems for supplying heat to the tunnel 24 are described generally in U.S. Pat. Nos. 5,277,105, 6,481,433 and 6,655,373, the disclosures of which are incorporated herein by reference insofar as they relate to heat delivery systems for ovens. As shown diagrammatically in FIG. 4 by way of example, the heat source for the conveyor oven 20 includes a pair of burners 100, 150 with respective heating flames 64, 66 supplying heat to respective independent plenums 68, 70 associated with segments 20A and 20B of the oven 20. The heated air from the plenums 68, 70 is blown into the two oven segments 20A, 20B by separate blower fans 72, 74 through holes (e.g., 75 and 77) in groupings of metal fingers 76, 78 associated with the respective oven segments 20A, 20B. The temperature in each tunnel segment 20A, 20B is monitored by a temperature sensor 80, 82. The temperature sensors 80, 82 can include a thermocouple, a thermistor, or any other type of temperature sensing element. The temperature sensors 80, 82 can be positioned in either the tunnel 24 or within the plenums 68, 70, and are connected to the controller 42.

Figure 4:
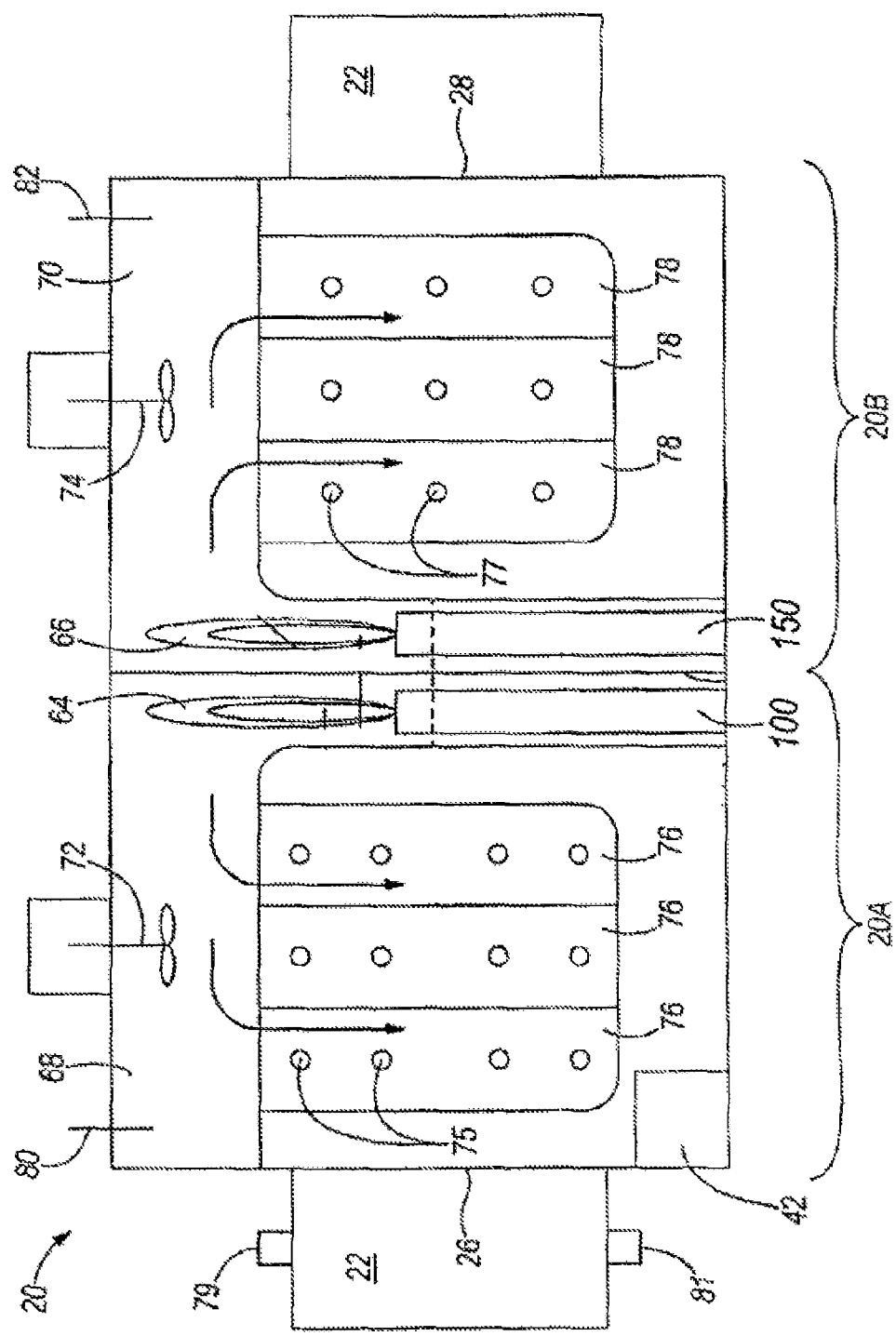
FIG. 4 is a diagrammatic representation of the tunnel of the conveyor oven of FIG. 1.

The configuration of the conveyor oven 20 illustrated in FIG. 4 is presented by way of example only. In this regard, it will be appreciated that the conveyor oven 20 can have any number of tunnel segments 20A, 20B (including a single tunnel segment, or three or more tunnel segments), any number of temperature sensors 80, 82 located anywhere along the conveyor 22 (whether inside or outside the tunnel 24), any number of burners 100, 150, and any number of fingers 76, 78, sets of such fingers 76, 78, or other elements and devices for distributing heated air to desired locations above and/or below the conveyor 22. Also, although the illustrated conveyor oven 20 has two plenums 68, 70, heated air can instead be produced and moved through the conveyor oven 20 through any other number of plenums, and through appropriate ducts and conduits that are not necessarily identifiable as plenums 68, 70.

In some embodiments, the speed of the main blowers 72, 74 may be varied at times to reduce the amount of energy used by the conveyor oven 20 during periods of non-activity. To provide control over fan speed in these and other cases, the main blowers 72, 74 can be driven by variable-speed electric motors (not shown) coupled to and controlled by the controller 42. Power can be supplied to each variable-speed motor by, for example, respective inverters. In some embodiments, each inverter is a variable-speed inverter supplying power to the motor at a frequency that is adjustable to control the speed of the motor and, therefore, the speed of each of the main blowers 72, 74. An example of such an inverter is inverter Model No. MD60 manufactured by Reliance Electric (Rockwell Automation, Inc.). By utilizing variable speed motors supplied by power through respective inverters as just described, a significant degree of control over fan speed and operation is available directly via the controller 42 connected to other components of the control system. A similar motor control arrangement can also be used to control the speed of the combustion blower 155 (described in greater detail below), which functions to provide an appropriate level of air to the burners 100, 150 for proper combustion of fuel supplied to the burners 100, 150.

The main blowers 72, 74 described and illustrated herein can be located at any of a variety of locations with respect to the plenums 68, 70 of the oven 20, and can be used to pull and/or push air with respect to the plenums 68, 70 and/or the tunnel 24. For example, in some embodiments, the main blowers 72, 74 are positioned and oriented to draw air from the tunnel 24 into one of the plenums 68, 70. The suction caused by the main blowers 72, 74 lowers the air pressure in the tunnel 24 and increases the air pressure in the plenums 68, 70, thereby forcing heated air from the plenums 68, 70 into the tunnel 24 through the fingers 76, 78. In other embodiments, the main blowers 72, 74 are oriented to draw heated air from each of the plenums 68, 70 into the tunnel 24 through the metal fingers 76, 78.

Figure 5:
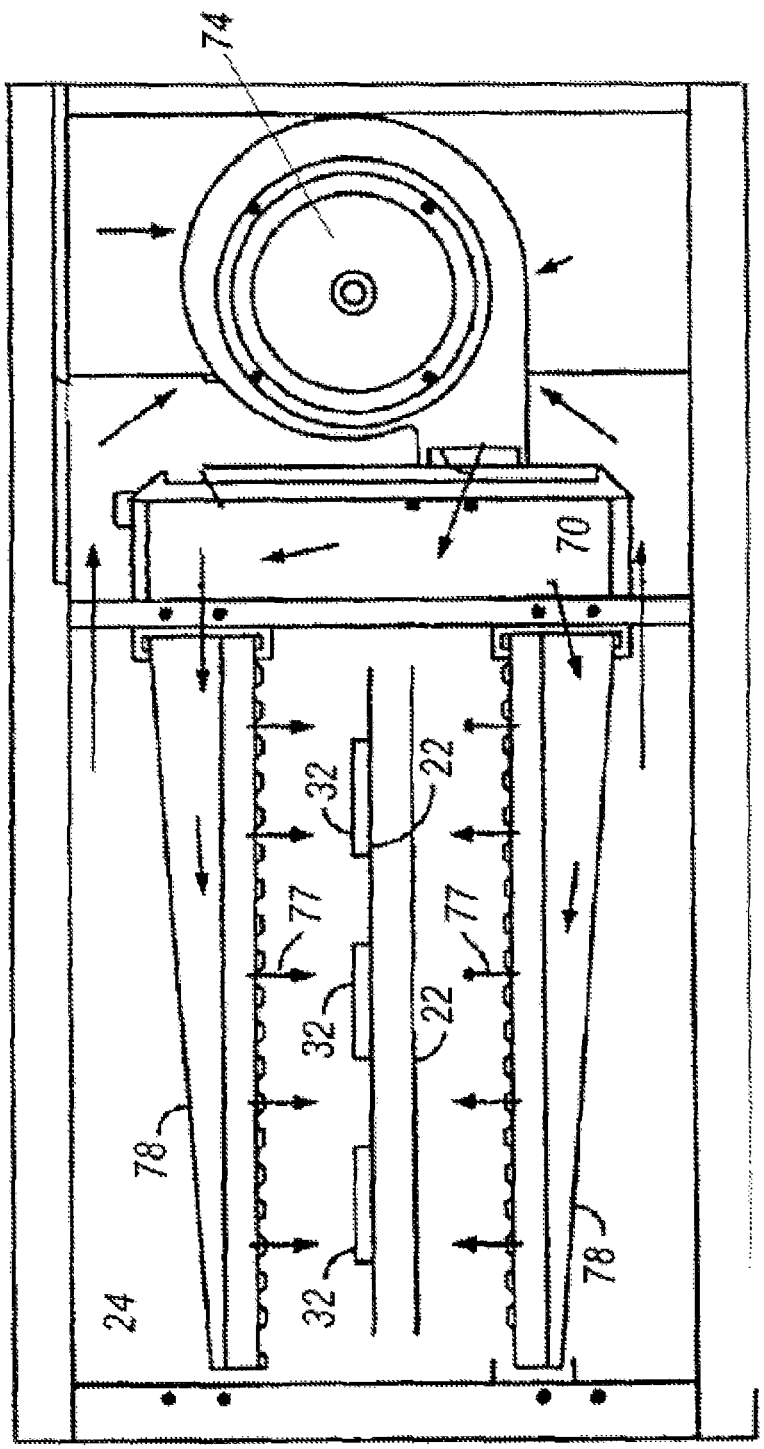
FIG. 5 is a side view of the internal compartments of the conveyor oven of FIG. 1.

An example of an orientation and layout of components in a conveyor oven 20 according to the present invention is shown in FIG. 5, which is a cross-sectional view of one of the oven segments 20B shown in FIG. 4. With reference to FIG. 5, a main blower 74 draws air from the tunnel 24 into the plenum 70. The air is heated in the plenum 70 and is forced back into the tunnel 24 through the metal fingers 78 due to the increased air pressure in the plenum 70 caused by the main blower 74. Upper and lower metal fingers 78 extend above and below the conveyor 22 in the tunnel 24. Holes 77 on the upper and lower metal fingers 78 direct the heated air toward food items 32 that are located on the conveyor 22, thereby cooking the food items 32.

Figure 6:
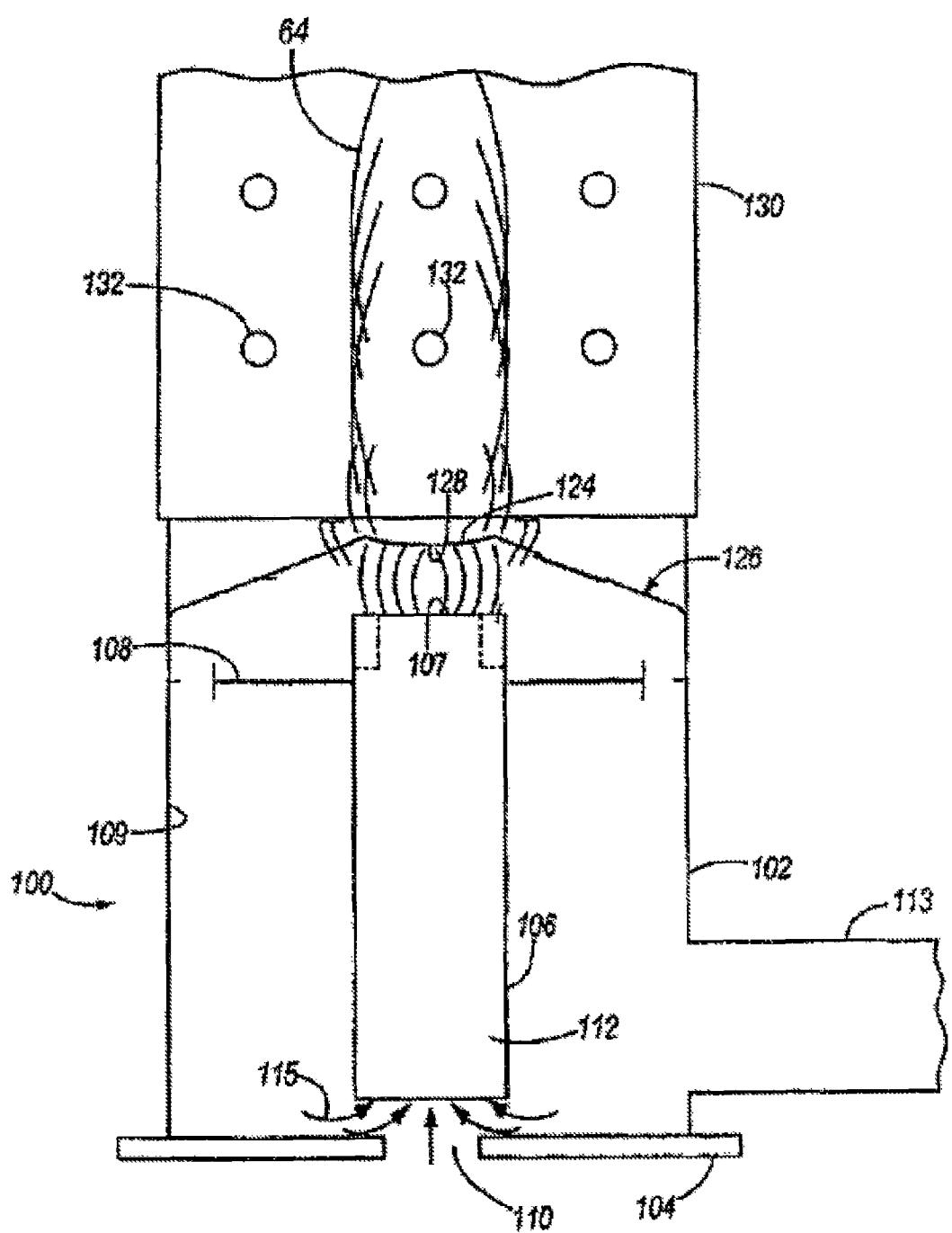
FIG. 6 is a diagrammatic representation of a gas burner.

FIG. 6 illustrates a burner 100 of the oven 20 illustrated in FIGS. 1-5. The illustrated burner 100 comprises a housing (e.g., an outer tube 102 as shown in the illustrated embodiment) attached to a mounting plate 104 which closes off the proximal end of the outer tube 102. The outer tube 102 has a relatively elongated shape as shown in the illustrated embodiment. A smaller diameter venturi tube 106 is located within the outer tube 102, and has open distal and proximal ends 107, 112. The illustrated venturi tube 106 is generally centered with its longitudinal axis along the longitudinal axis of the outer tube 102, and is secured in place near its distal end 107 by a venturi support 108 encircling the venturi tube 106 and secured within the inside diameter 109 of the outer tube 102.

With continued reference to the illustrated embodiment of FIG. 6, a gas orifice 110 is located in the mounting plate 104, and is spaced from the proximal open end 112 of the venturi tube 106. Fuel is provided to the gas orifice 110 from a fuel source through an electronically-controlled modulating fuel valve 408 (described below). The open proximal end 112 of the venturi tube 106 receives pressurized gas from the gas orifice 110, and also serves as a primary air inlet to admit a flow of air 115 into the venturi tube 106. Powered air is supplied from the combustion blower 155 (see FIG. 3) to the outer tube 102 below the venturi support 108. The combustion blower 155 is coupled to the outer tube 102 in the illustrated embodiment via a conduit 113 leading to the outer tube 102.

The burner 100 illustrated in FIG. 6 also includes a target 124 with a surface 128 positioned opposite the distal end 107 of the venturi tube 106 and held in place by arms 126. In some embodiments, the outer tube 102 of the burner 100 is coupled to a flame tube 130, which can include a number of air openings 132, thereby supplying further oxygen to the burning gas supporting the flame.

The structure of the burner 100 illustrated in FIG. 6 allows the combustion blower 155 to provide air to the burner flame, enabling a proper mix of fuel and air necessary to achieve an optimal flame. If insufficient air is provided to the burner flame, the flame will not be able to burn the fuel, and may extinguish itself. If too much air is provided, the flame will lift off of the burner 100, and may extinguish. Therefore, the speed of the combustion blower 155 can be modulated to optimize the flame.

However, the speed of the combustion blower 155 is not the only variable that can affect the efficiency of the flame. The flame can also be adversely (or positively) affected by the speed of the main blowers 72, 74. For example, in some embodiments, the speed of the main blowers 72, 74 can be adjusted to save energy during operation of the oven—a change that can affect the efficiency of the flame. In the illustrated embodiment, the photosensor 79, 81 can be used to detect whether a food item has been placed on the conveyor 22 (see step 300 of FIG. 7). If a food item is detected, a timer is reset (step 305), the speed of the main blower 72, 74 is increased (e.g., set to high in step 310), and the setpoint temperature of the oven 20 is also increased (e.g., the output of the modulating fuel valve 408 (described in greater detail below) is set to high in step 315). If no food item is detected on the conveyor 22 and the timer exceeds a predefined threshold (step 320), the speed of the main blower 72, 74 is set to a lower energy-savings mode (step 325), and the temperature of the oven 20 can be either decreased to a lower "energy-savings" set-point temperature (step 330) or maintained at the original set-point temperature. Additional and more detailed conveyor oven operations associated with such energy-savings modes are described in International Patent Application No. PCT/2009/030727, the entire disclosure of which is incorporated herein by reference.

Figure 7:
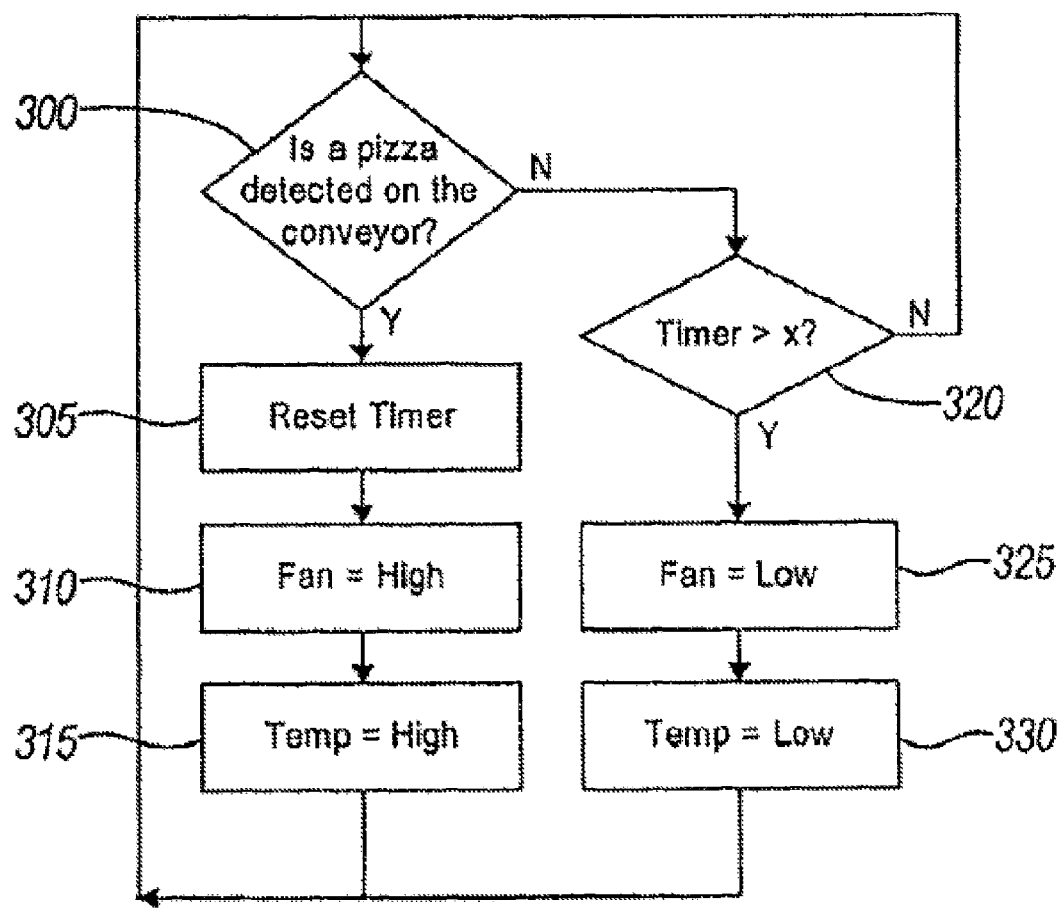
FIG. 7 is a flowchart illustrating an energy management mode for the conveyor oven of FIG. 1.
Figure 7A:
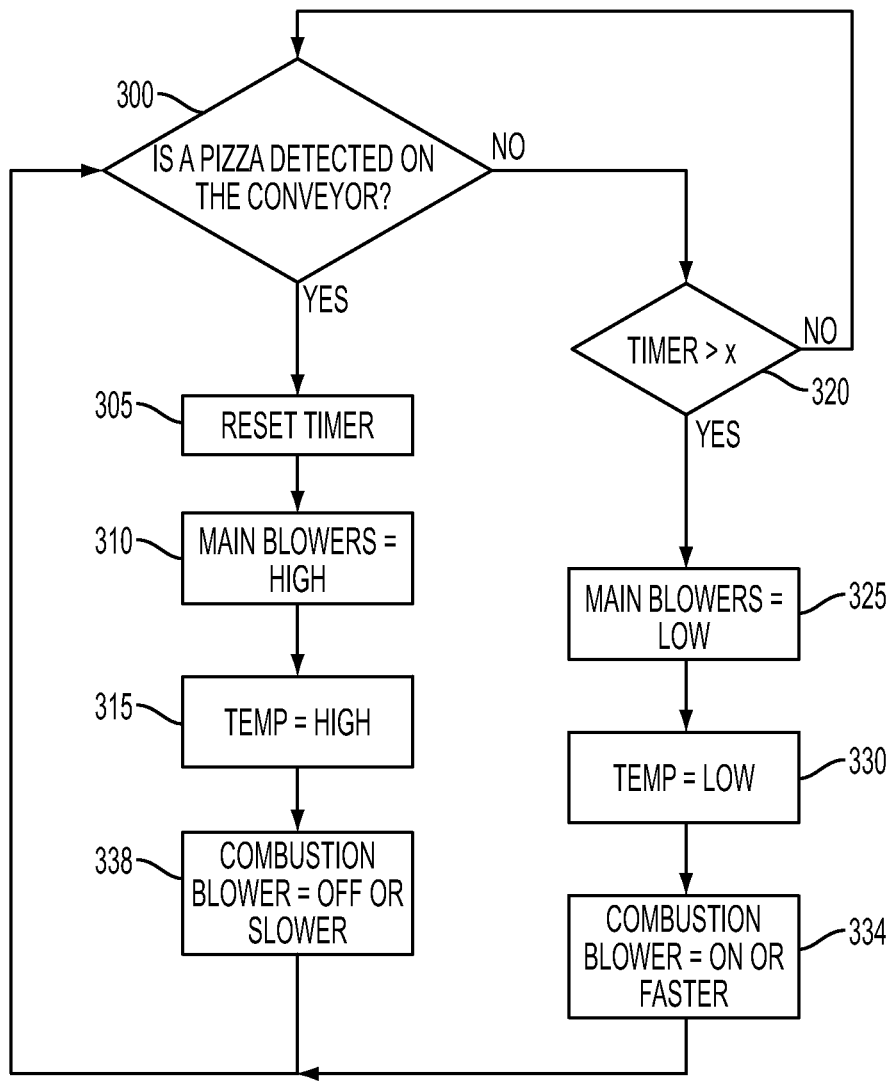
FIG. 7a is a flow chart illustrating an alternative energy management mode for the conveyor oven of FIG. 1.

When the timer illustrated in FIG. 7 expires, the amount of air provided to the burner 100, 150 can be automatically decreased as the speed of the main blower 72, 74 is decreased. Similarly, when a food item is later detected on the conveyor 22, the amount of air provided to the burner 100, 150 can be automatically increased as the speed of the main blower 72, 74 is increased. Either transition can adversely affect the quality of the burner flame, absent other adjustment of airflow provided to the burner 100, 150. In some specific constructions, the low, energy saving operating speed of the main blowers 72, 74 is near or below the threshold required to maintain the burner flames 64, 66. As such, in those particular constructions, the combustion blower 155 may be activated, or increased in speed, to compensate for the lack of airflow (see step 334 in FIG. 7a). In addition, the combustion blower 155 may be de-activated or reduced in speed once the main blower 72, 74 produces a sufficient amount of airflow to sustain the flames 64, 66 of the burners 100, 150 (see step 338 of FIG. 7a).

The temperature of the oven 20 can also affect the rate at which air is circulated through the oven 20, independent or at least partially independent of the speed of the main blowers 72, 74. As the air increases in temperature, the air becomes less dense. Therefore, suction from one oven chamber to another (e.g., suction from an oven plenum to the tunnel, or vice versa) can gradually reduce as air temperature at different locations within the oven 20 increases or decreases. For example, as air temperature within the tunnel 24 of the oven 20 increases in the illustrated embodiment, air pressure within the tunnel 24 increases, thereby reducing the ability of air to move from the burners 100, 150 into the tunnel 24. Accordingly, increased air supply to the burners 100, 150 can be needed in order to maintain an optimal flame.

Figure 8:
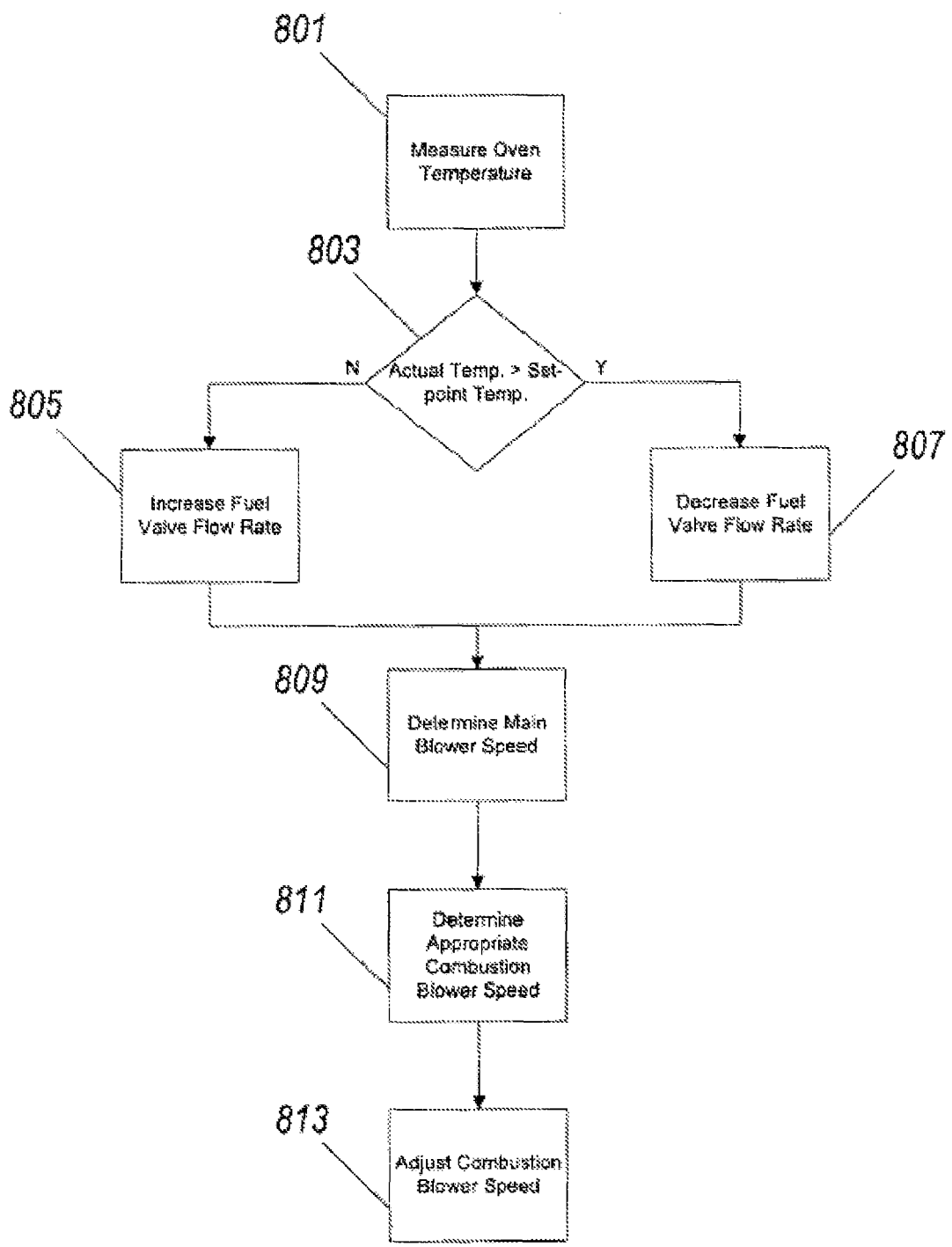
FIG. 8 is a flowchart illustrating a method of controlling a combustion blower in the conveyor oven of FIG. 1.

To address the changing needs of air supply to the burners 100, 150 based at least upon changes in main blower speed 72, 74, FIG. 8 illustrates a method of controlling the conveyor oven 20 based upon the speed of the main blowers 72, 74. The conveyor oven 20 described above in connection with FIG. 4 is divided into two segments in which blower speed and burner output are controlled separately. As such, the method illustrated in FIG. 8 is described by way of example only in reference to controlling the components associated with the first oven segment 20A of the conveyor oven 20. However, the method can also or instead be applied to any other segment of a conveyor oven 20, including in ovens that are not divided into separate oven segments.

With continued reference to FIG. 8, the controller 42 begins by monitoring the temperature sensor 80 (see FIG. 4) and measuring the oven temperature (step 801). If the actual temperature in the oven 20 is greater than the set-point temperature (step 803), the controller 42 decreases the flow rate of the modulating fuel valve (step 805) supplying fuel to the burner 100, thereby decreasing the amount of fuel provided to the burner 100 and decreasing the strength of the burner flame. Conversely, if the actual temperature in the oven 20 is less than the set-point temperature, the controller 42 increases the flow rate of the modulating fuel valve (step 807), thereby increasing the amount of fuel provided to the burner 100 and increasing the strength of the burner flame.

As described above with reference to FIG. 7, the controller 42 can operate the main blower 72 to run the main blower 72 at a high-speed or lower-speed setting (and in some embodiments, at a number of other speeds or in any of a range of speeds). Therefore, in this embodiment, the controller 42 acts as a "feed-forward" system, and is able to determine the speed of the main blower 72 (step 809) without necessitating any additional sensor equipment. In other embodiments, a pressure sensor can be positioned adjacent or otherwise with respect to the main blower 72, or a motor speed sensor can be used to directly measure the speed of the main blower 72 (i.e., a "feedback" system).

At this point, the controller 42 in the illustrated embodiment has already determined the internal temperature of the oven 20, the flow rate of the modulating fuel valve 408 (described in greater detail below), and the speed of the main blower 72 (or these values are otherwise known or set). The controller 42 then uses this information to determine an appropriate speed for the combustion blower 155 (step 811). This determination can be reached in a number of different manners. In some embodiments, the controller 42 accesses a computer readable memory which stores a look-up table. As illustrated in FIG. 9, the look-up table identifies a series of combustion blower speeds based upon oven temperature and main blower speed. For example, if the oven temperature is measured as 290 degrees and the controller 42 is operating the main blower 72 at a high-speed setting, the look-up table defines Y5 as the appropriate combustion blower speed. Similarly, if the oven temperature is measured as 260 degrees and the controller 42 is operating the main blower 72 at the low-speed setting, the look-up table identifies X2 as the appropriate combustion blower speed.

The values of variables X1 through X11 and Y1 through Y11 will vary depending upon the size, shape, and configuration of the conveyor oven 20 and, therefore, can be specific to each conveyor oven model utilizing such a look-up table. Furthermore, some embodiments of the look-up table can include additional variables that affect the identified combustion blower speed. For example, in some look-up tables, the combustion blower speed setting can be based upon oven temperature, main blower speed, and the flow rate of the modulating fuel valve 408 associated with the burner.

In other embodiments, the controller 42 determines the appropriate combustion blower speed by calculating a value. By way of example only, the value can be calculated by the controller 42 based at least in part upon the following formula:

$$\text{Combustion Blower Speed} = (A \times \text{Gas Flow Rate}) - (B \times \text{Main Blower Speed}) + (C \times \text{Oven Temperature})$$

or by the following alternate formula:

$$\text{Combustion Blower Speed} = (A \times \text{Gas Flow Rate}) - (B \times \text{Main Blower Speed})$$

or by the following alternate formula:

$$\text{Combustion Blower Speed} = (A \times \text{Gas Flow Rate}) + (C \times \text{Oven Temperature})$$

wherein A, B, and C are coefficients determined at least in part upon the size, shape, and configuration of the conveyor oven 20 and components of the conveyor oven 20, such as the size and/or shape of the plenum 68, 70, the position of the combustion wherein A, B, and C are coefficients determined at least in part upon the size, shape, and configuration of the conveyor oven 20 and components of the conveyor oven 20, such as the size and/or shape of the plenum 68, 70, the position of the combustion blower 155 with respect to the fingers 76, 78 and the plenum 68, 70, and the like.

With continued reference to FIG. 8, after the controller 42 has determined an appropriate speed for the combustion blower 155 (step 811), the controller 42 proceeds to operate the combustion blower 155 at that speed (step 813). The controller 42 can repeat the method illustrated in FIG. 8 periodically to continue to adjust the internal temperature of the conveyor oven 20 toward a set-point temperature while maintaining optimal flame conditions.

Figure 10:
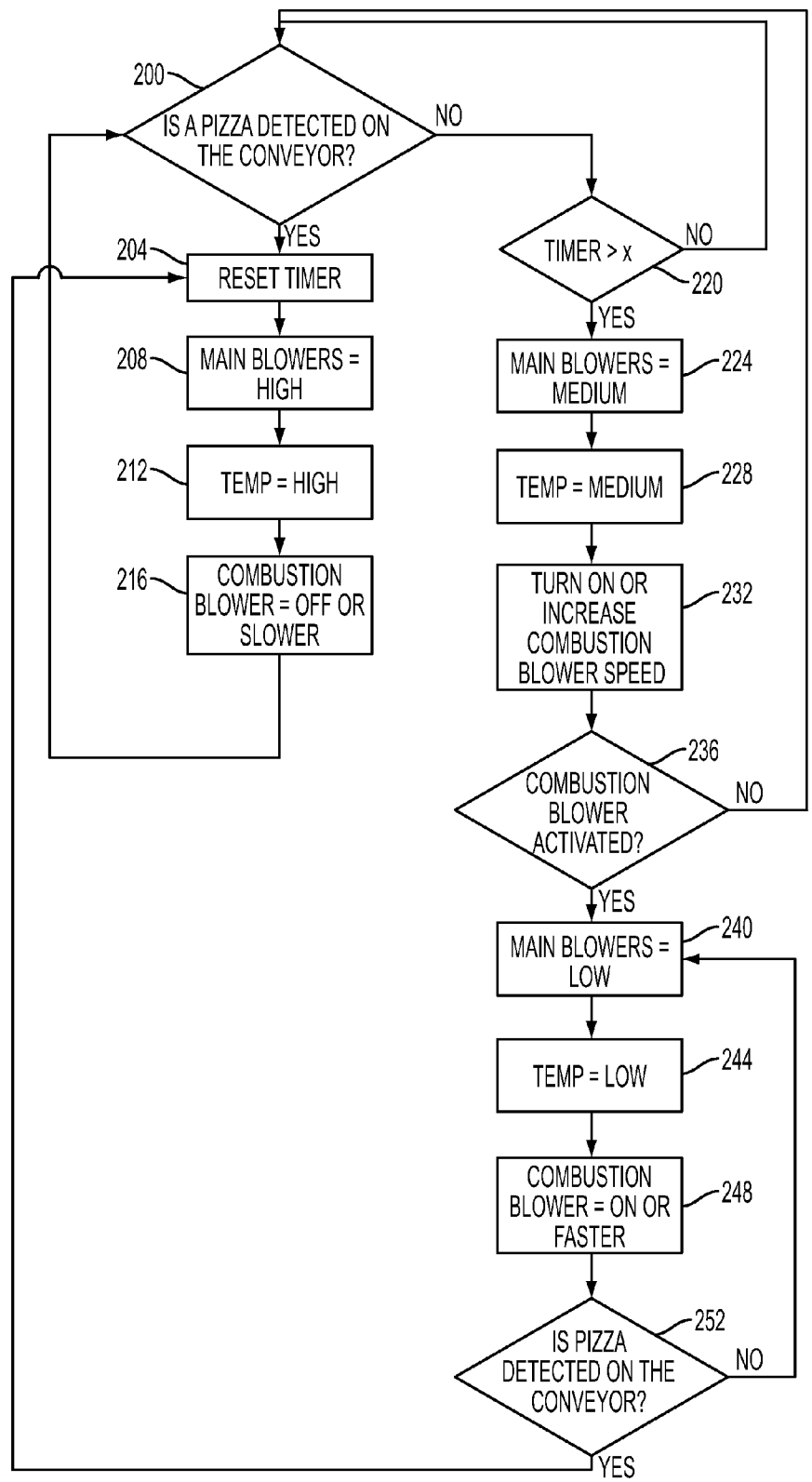
FIG. 10 is flowchart illustrating a second alternative energy management mode for the conveyor oven of FIG. 1.

FIG. 10 illustrates an alternative energy management mode for the conveyor oven 20. Similar to the energy saving mode depicted in FIG. 7, a photosensor 79, 81 can be used to detect whether a food item has been placed on the conveyor 22 (see step 200 of FIG. 10). If a food item is detected, a timer is reset (step 204), the speeds of the main blowers 72, 74 are increased to a first, or high, operating speed (see step 208) (or to any desired increased operating speed), and the setpoint temperature of the oven 20 is also increased (e.g., the output of the modulating fuel valve 408 is set to high in step 212). The combustion blower 155 generally remains off during this process (see step 216), although in other embodiments the combustion blower can be operating to provide additional air to the burners 100, 150.

If no food item is detected on the conveyor 22 and the timer exceeds a predefined threshold (see step 220), the speeds of the main blowers 72, 74 are set to a second or medium speed (see step 224) (or to any other reduced speed). In some embodiments, the intermediate speed of the main blowers 72, 74 is generally considered to be the lowest possible operating speed where the amount of air circulated through the oven by the main blowers 72, 74 is sufficient to maintain the flames 64, 66 of the burners 100, 150 without requiring assistance from the combustion blower 155. In other embodiments, the intermediate speed of the main blowers 72, 74 is higher than this. Furthermore, the temperature setting is decreased (e.g., the output of the modulating fuel valve 408 is set to medium, or otherwise to a lower level in step 228) to correspond with the reduced airflow. In the illustrated embodiment, the controller 42 also attempts to activate the combustion blower 155 at this time (see step 232). Alternatively at this step 232, the speed of the combustion blower 155 can be increased from a lower operating state.

In some embodiments, an air switch or current switch (not shown) may be used to verify that the combustion blower 155 has been activated (see step 236). If the combustion blower 155 has failed to activate, due to malfunction, jamming, and the like, the main blowers 72, 74 and temperature setting (e.g., modulating valve 408) can remain at their corresponding medium settings (see steps 200, 220, 224, 228) until a food item is detected on the conveyor 22. By remaining in the intermediate energy savings mode, the oven 20 is able to save energy (through the reduced blower speed and temperature setting) without compromising the integrity of the flames 64, 66, which could possibly become unstable without the assistance of the combustion blower 155 if the main blower 72, 74 speeds were to be reduced any further.

If the controller 42 detects that the combustion blower 155 has been activated and is running, the speed of the main blowers 72, 74 is set to a third, low setting (see step 240). In other embodiments, the main blowers 72, 74 may be turned off. In some embodiments, the low speed of the main blowers 72, 74 is below the minimum speed required to maintain the flames 64, 66 of the burners 100, 150, and is a speed at which a greater (and in some cases, a maximum) energy savings is achieved. Furthermore, the setpoint temperature is also set to a third, low setting (see step 244) to compensate for the drop of airflow, and provides greater (and again in some cases, a maximum) energy savings. The combustion blower 155 remains running to maintain the integrity of the flames 64, 66 until a food item is detected on the conveyor 22 (see step 252), at which point the combustion fan 155 is deactivated or reduced in speed (see step 216), the main blowers 42, 44 are turned to high or are otherwise increased in speed (see step 208), the timer is reset (see step 204), and the setpoint temperature is returned to high (step 212).

In alternative embodiments of the energy management mode shown in FIG. 10, the controller 42 may also be responsive to a gas burner flow rate (e.g., during step 236). The gas burner airflow rate is generally defined as the rate at which air flows through the burners 100, 150 to be used in combustion (e.g., flow B in FIG. 16). In the illustrated construction, the gas burner airflow rate is at least partially produced by the speed of the main blowers 72, 72 and the speed of the combustion blower 155. Furthermore, in such embodiments, the controller 42 may change the speed of the main blowers 72, 74 from the second, intermediate speed to the third, low speed (see step 240) when the gas burner airflow rate has exceeded a predetermined minimum.

Figure 11:
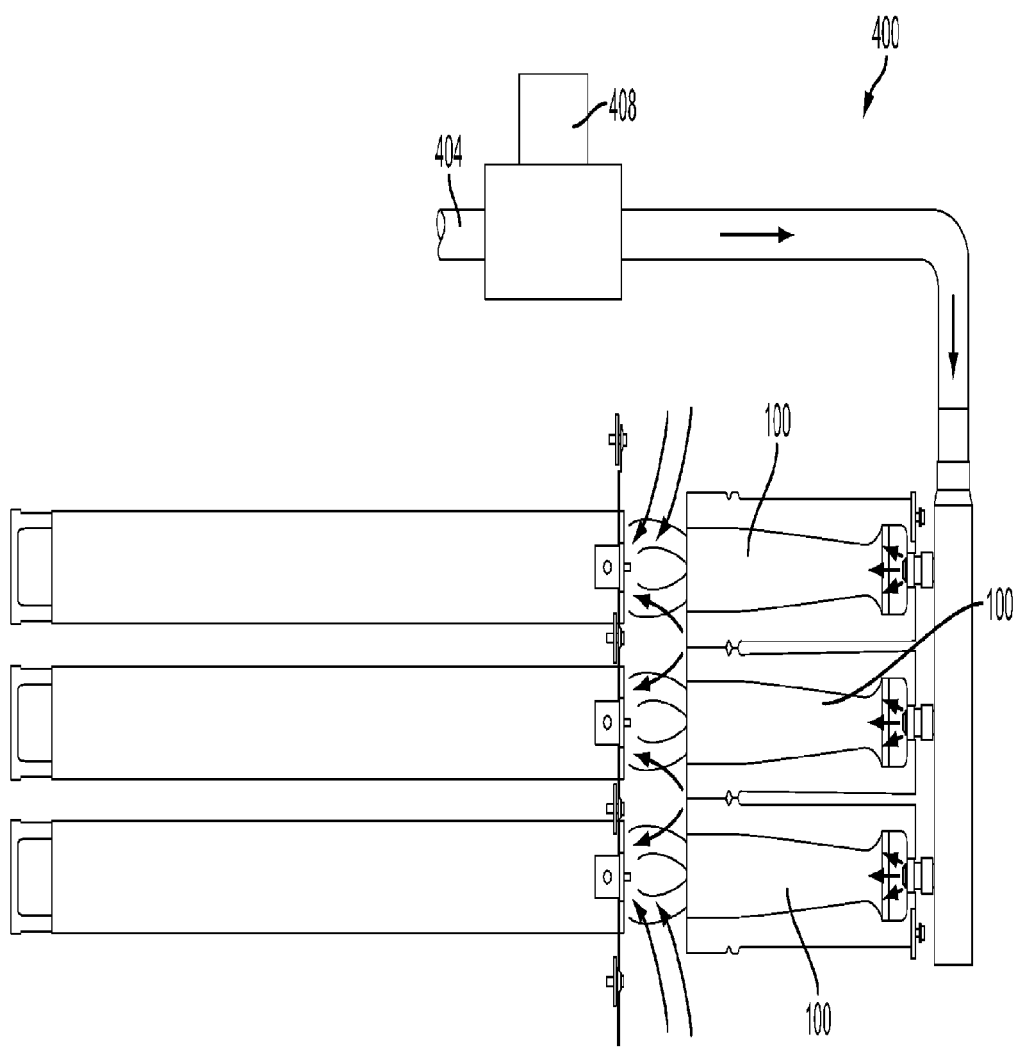
FIG. 11 is a schematic view of a first embodiment of a conveyor oven fuel delivery system, shown in a first operating mode.
Figure 12:
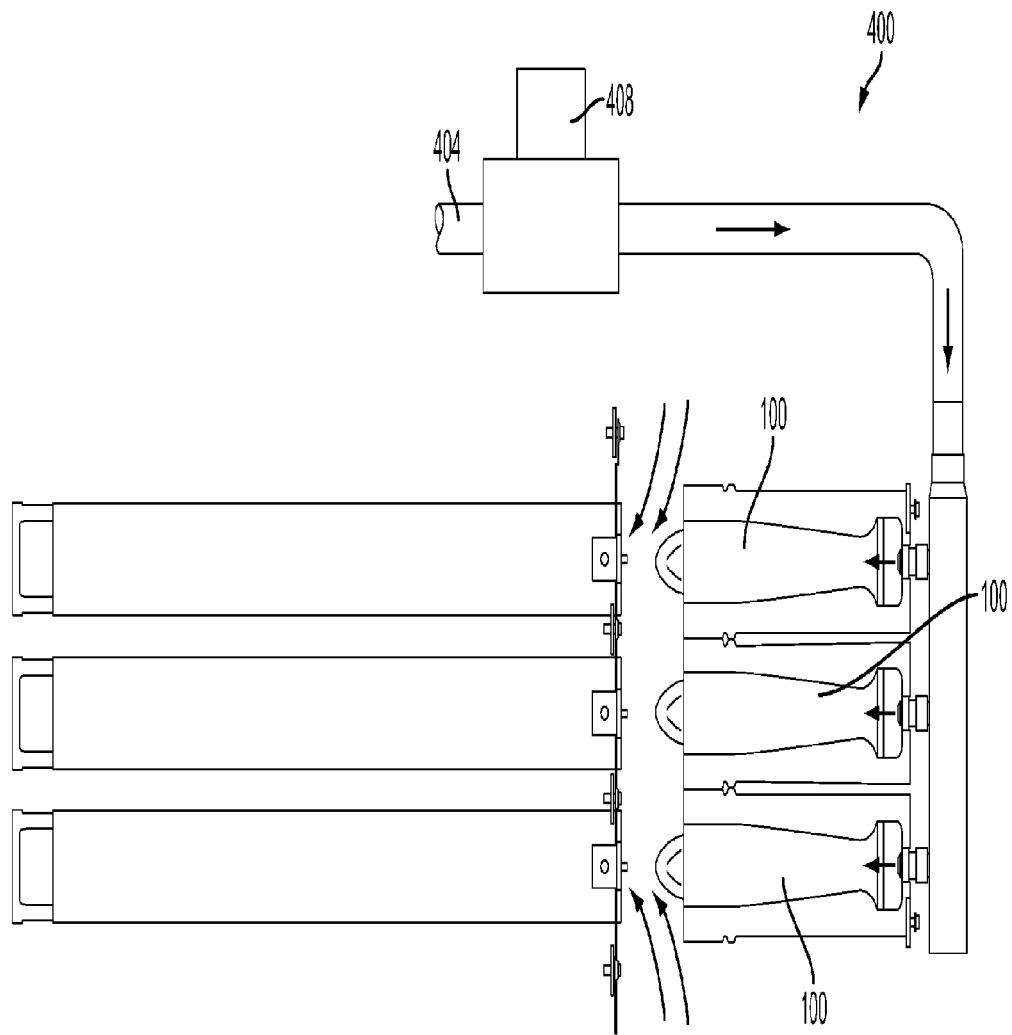
FIG. 12 is a schematic view of the conveyor oven fuel delivery system of FIG. 11, shown in a second operating mode.

FIGS. 11-12 illustrate a first embodiment of a fuel delivery system 400 for use with the conveyor oven 20 of the present invention. The fuel delivery system 400 is configured to supply pressurized gas, such as propane, butane, natural gas, and the like, to the burners 100 (e.g., inshot burners) of the heat delivery system (described above). The fuel delivery system 400 is couplable to a gas input 404, such as a utility line, supply tank, and the like, and includes a modulating valve 408 to regulate the flow of gas therethrough. In the illustrated embodiment, the modulating valve 408 is regulated by the controller 42.

During operation of the conveyor oven 20, the first embodiment of the fuel delivery system 400 is adjustable between a first operating mode and a second operating mode. More specifically, the controller 42, responsive at least in part to one or more inputs from the conveyor oven 20 (see FIG. 3), adjusts the modulating valve 408 to regulate the flow of gas to the burners 100, thereby controlling the intensity at which the burners 100 operate. In the following description and the accompanying drawings, reference is made to burners 100, which can be those used in the earlier-described embodiments of the present invention. It should be understood, however, that this description and the accompanying drawings apply equally to the other burners (e.g., burners 150 described and illustrated herein) in other embodiments of the present invention.

In the first operating mode of the fuel delivery system 400 shown in FIGS. 11 and 12, the modulating valve 408 can be substantially open, allowing gas to flow freely to the burners 100 and causing the burners 100 to operate at a first, high intensity (see FIG. 11). In the second operating mode, the modulating valve 408 can be at least partially closed, restricting the flow of gas to the burners 100 and causing the burners 100 to operate at a second, lower intensity (see FIG. 12). In the illustrated embodiment of FIGS. 11 and 12, the first operating mode generally corresponds to a cooking mode and the second operating mode generally corresponds to an energy saving mode (e.g., when no food is present on the conveyor).

Furthermore, the modulating valve 408 may be continuously adjusted during either of the first and second operating modes to alter the intensity of the burners 100 as necessary (see FIG. 8). In alternative constructions, more than two operating modes may exist. In such cases, two or more energy savings modes can exist, with the amount of gas supplied to the burners 100 being different in each mode. In these and other embodiments, the modulating valve 408 may be controlled by the controller 42 to maintain a pre-determined temperature, BTU output, combustion ratio, and the like.

Figure 13:
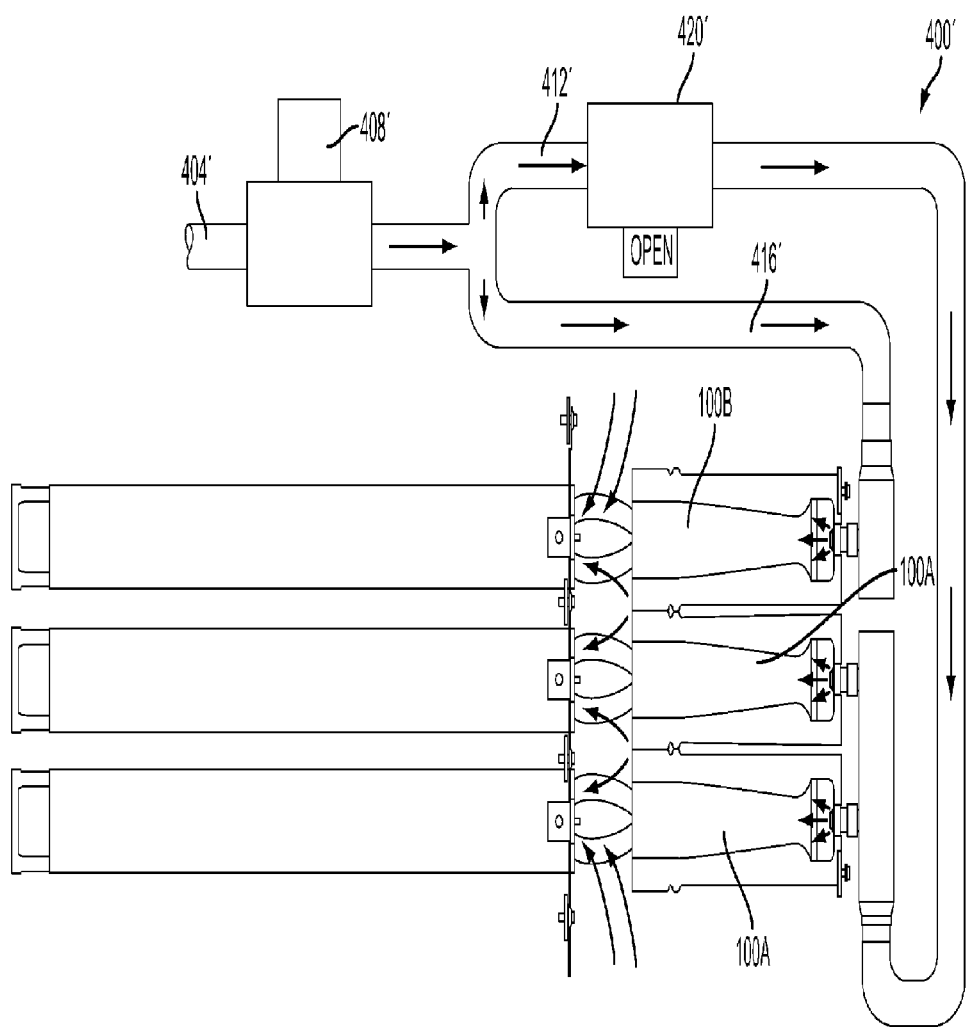
FIG. 13 is a schematic view of a second embodiment of a conveyor oven fuel delivery system, shown in a first operating mode.
Figure 14:
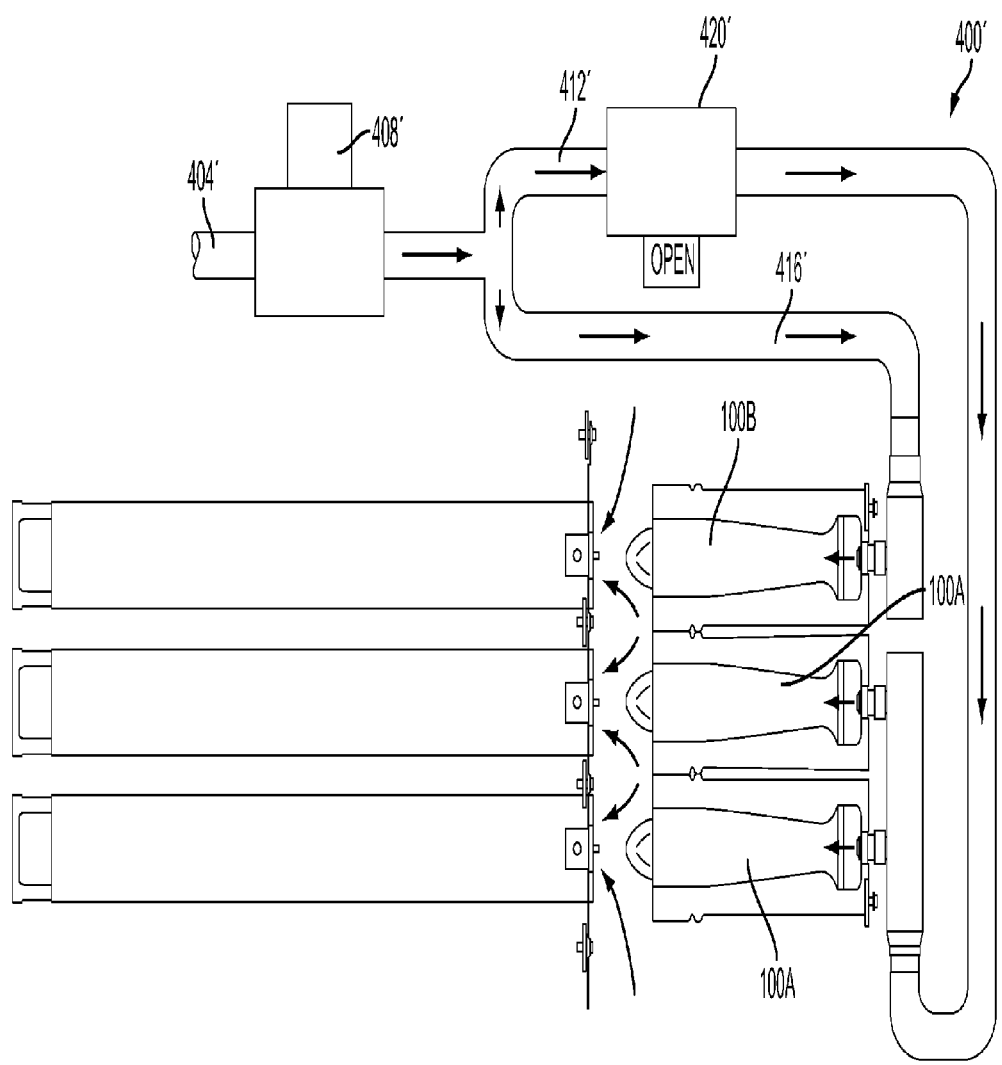
FIG. 14 is a schematic view of the conveyor oven fuel delivery system of FIG. 13, shown in a second operating mode.
Figure 15:
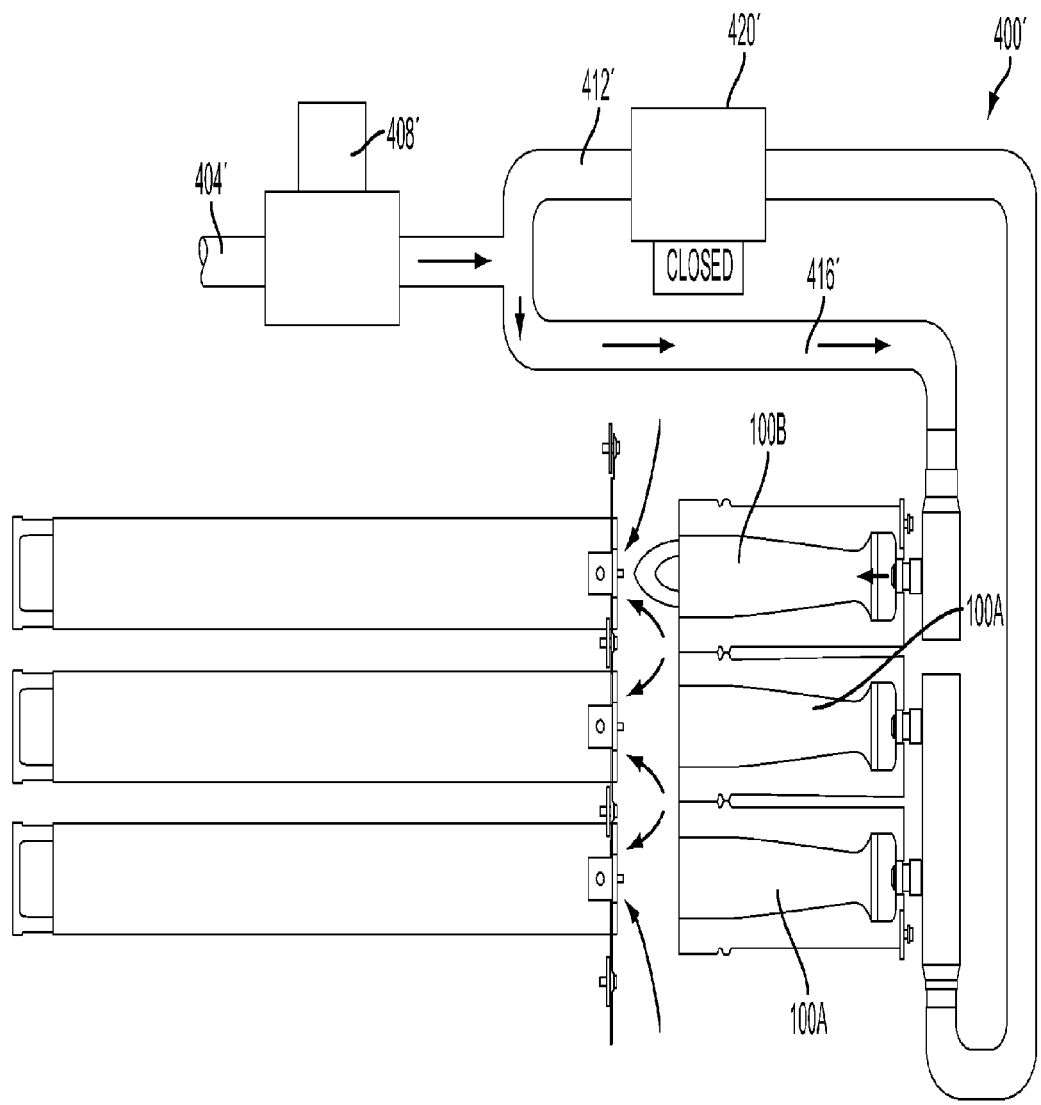
FIG. 15 is a schematic view of the conveyor oven fuel delivery system of FIG. 13, shown in a third operating mode.

FIGS. 13-15 illustrate a second embodiment of a fuel delivery system 400' according to the present invention. Similar to the first embodiment of the fuel delivery system 400, the second embodiment of the fuel delivery system 400' is configured to provide a pressurized gas, such as propane, butane, natural gas, and the like, to the burners 100A, 100B of the heat delivery system (described above). As with the fuel delivery system 400 described above, in the following description and the accompanying drawings, reference is made to burners 100A, 100B, which can be those used in the earlier-described embodiments of the present invention. It should be understood, however, that this description and the accompanying drawings apply equally to the other burners (e.g., burners 150 described and illustrated herein) in other embodiments of the present invention.

The fuel delivery system 400' is couplable to a gas input 404', such as a utility line, supply tank, and the like, and includes a modulating control valve 408' for regulating the flow of gas therethrough. The fuel delivery system 400' also includes a first gas supply line 412' establishing fluid communication between the modulating control valve 408' and a first set of one or more burners 100A, and a second gas supply line 416' in parallel to the first gas supply line 412' and establishing fluid communication between the modulating control valve 408' and a second set of one or more burners 100B. This second embodiment of the fuel delivery system 400' also includes a cut-off valve 420' positioned along the first gas supply line 412' to interrupt the flow of gas between the modulating valve 408' and the first set of burners 100A. In other embodiments, the fuel delivery system 400' may include more than two gas supply lines of either type 412, 416 just described, depending at least in part upon the specific requirements of the oven 20. In other embodiments, both the first and second gas supply lines 412', 416' may include a shut-off valve.

During operation of the conveyor oven 20, the second embodiment of the fuel delivery system 400' is adjustable between multiple operating modes (e.g., three modes, in the illustrated embodiment). More specifically, the controller 42, responsive at least in part to one or more inputs from the conveyor oven 20 (see FIG. 3), can control the modulating control valve 408' and the cut-off valve 420' to regulate the flow of gas to both the first set of burners 100A and the second set of burners 100B. For example, during a first operating mode, the modulating valve 408' and the cut off valve 420' are both substantially open, allowing gas to flow freely to both the first set and the second set of burners 100A, 100B. In this first operating mode, the first and second set of burners 100A, 100B can operate at a first, high intensity (see FIG. 13).

In a second operating mode, the modulating valve 408' is at least partially closed while the cut-off valve 420' remains open. This configuration restricts the flow of gas to both the first and second set of burners 100A, 100B, resulting in both sets operating at a second, lower intensity (see FIG. 14).

In a third operating mode, the modulating valve 408' is left in a fully-opened or partially-opened state, while the cut-off valve 420' is closed. As a result, no gas reaches the first set of burners 100A, while gas can flow freely to the second set of burners 100B. As such, the second set of burners 100B can operate at the first, high intensity (or any lower intensity desired), while the first set of burners 100A is extinguished (see FIG. 15). Furthermore, the modulating valve 408' may be further adjusted during the third operating mode to alter the intensity of the second set of burners 100B directly.

In the illustrated embodiment of FIGS. 13-15, the first operating mode substantially corresponds to a cooking mode, and the second and third operating modes substantially correspond to energy saving modes (e.g., when no food is present on the conveyor 22). In alternate constructions, more than three operating modes may exist. For example, additional supply lines similar to the first supply line 412' can supply fuel under control of additional respective on-off valves 420' to one or more respective burners 100, thereby enabling one or more on-off valves 420' to be turned off or on in stages to gradually shut off or turn on one or more burners 100 at a time, respectively. In this manner, a more graduated control over fuel consumption is provided by enabling greater control over the number of burners 100 in operation at any given time. In these and other constructions, the controller 42 may include a single operating mode that continuously varies the flow of gas (e.g., through the modulating and cut off valves 408', 420') to maintain a pre-determined temperature, BTU output, combustion ratio, and the like.

FIGS. 16-20 illustrate an alternative embodiment of the conveyor oven 20' according to the present invention. In the embodiment of FIGS. 16-20, the conveyor oven 20' employs much of the same structure and has many of the same properties as the previously-described conveyor oven 20 shown in FIGS. 1-6. Accordingly, common elements have been given the same reference number with a prime (') indicator. The following description of the conveyor oven 20' focuses primarily upon structure and features different than the previously-described embodiments. Reference is made to the description of the conveyor oven 20 above for details of the structures and operation, as well as alternatives to the structures and operation, of the conveyor oven 20' not specifically discussed herein.

Figure 16:
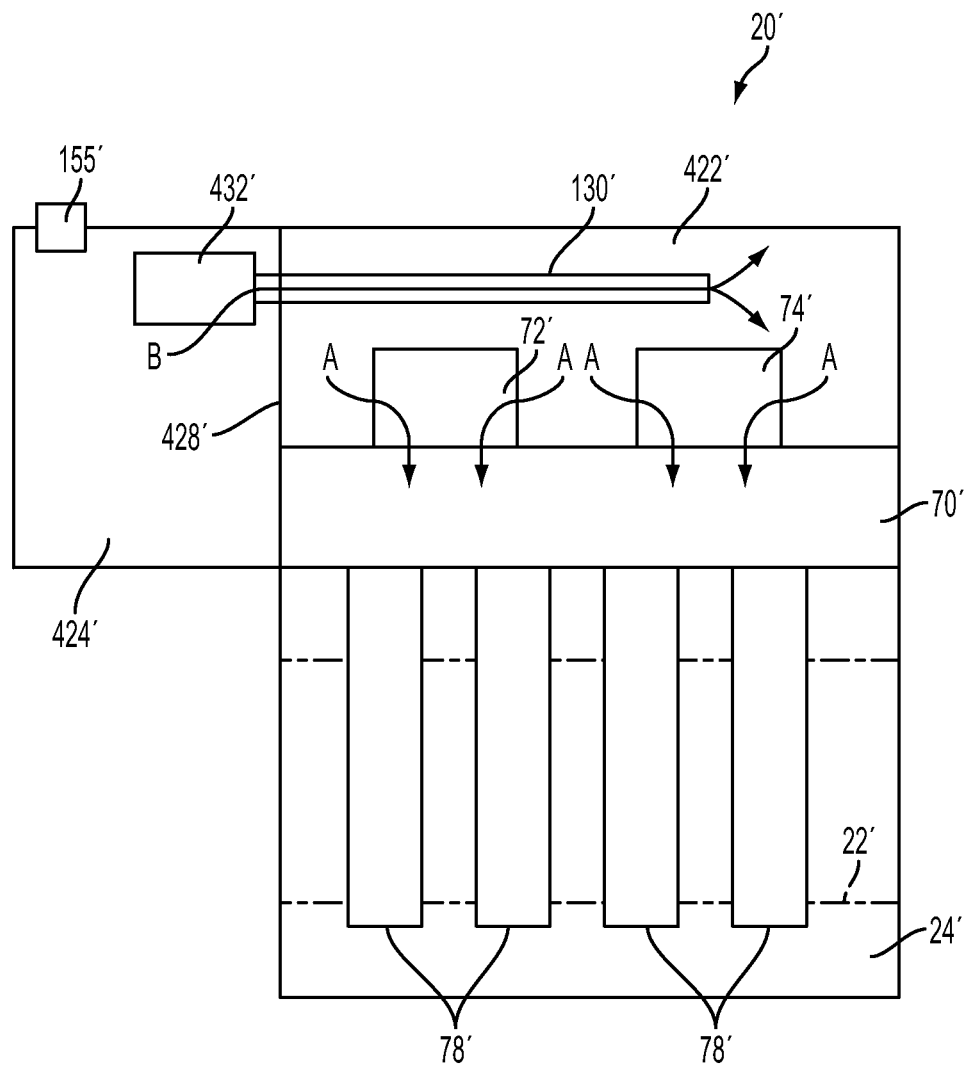
FIG. 16 is a plan view of another embodiment of a conveyor oven according to the present invention.
Figure 17:
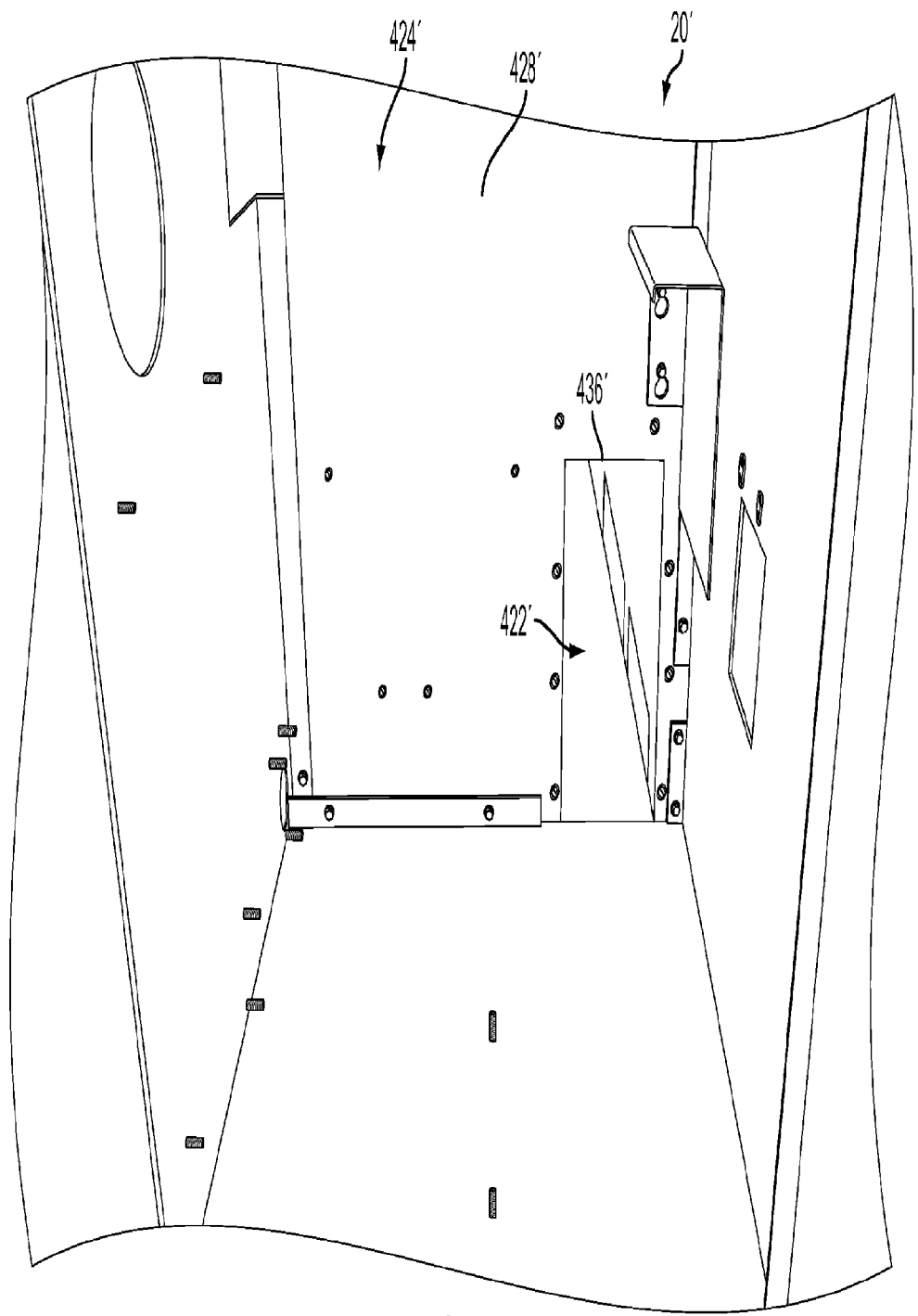
FIG. 17 is a perspective view of a burner compartment of the conveyor oven of FIG. 16, shown with the heat and fuel delivery systems removed.
Figure 18:
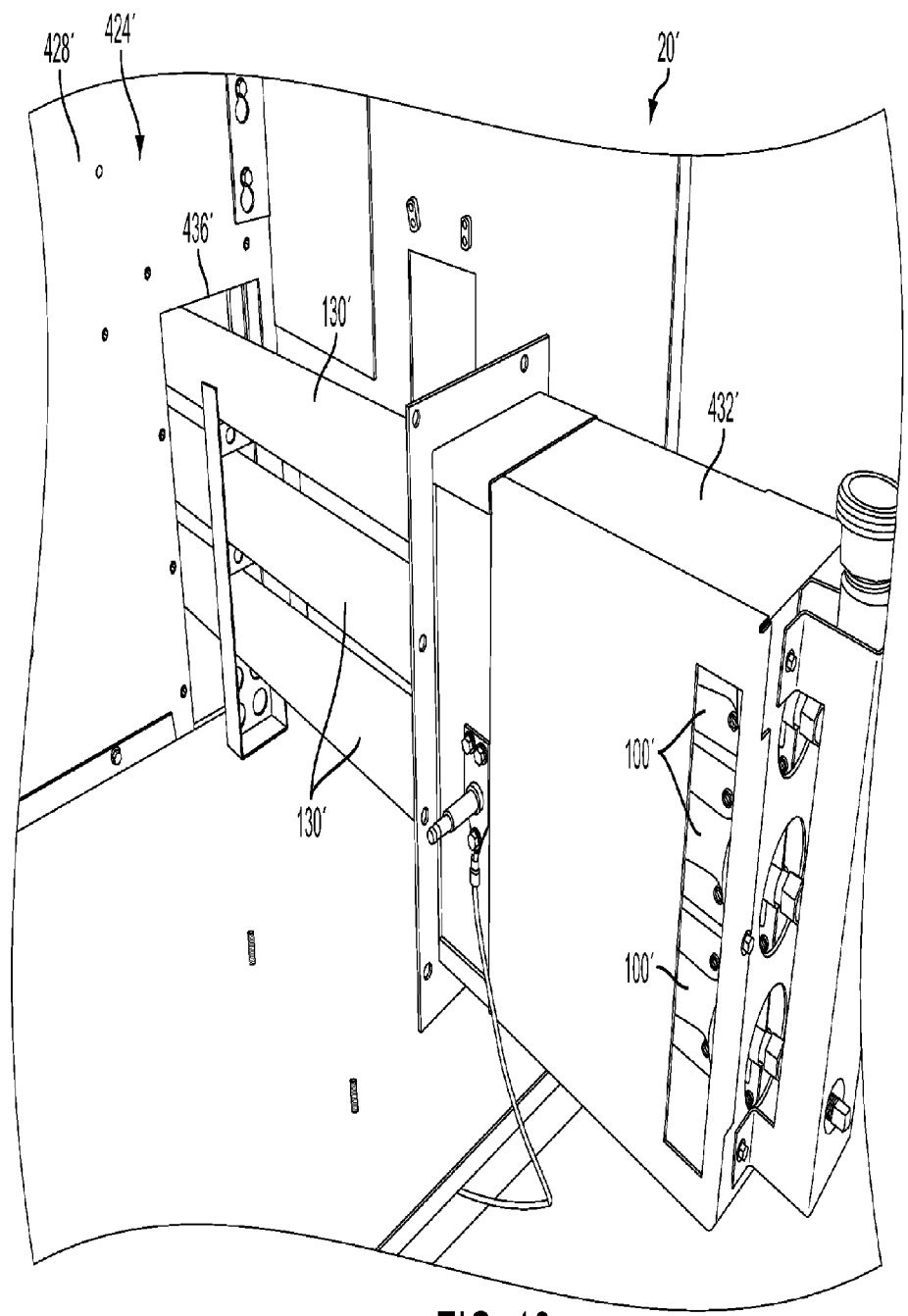
FIG. 18 is a perspective view of the burner compartment of the conveyor oven of FIGS. 16 and 17, shown with a burner assembly partially removed from the plenum.
Figure 19:
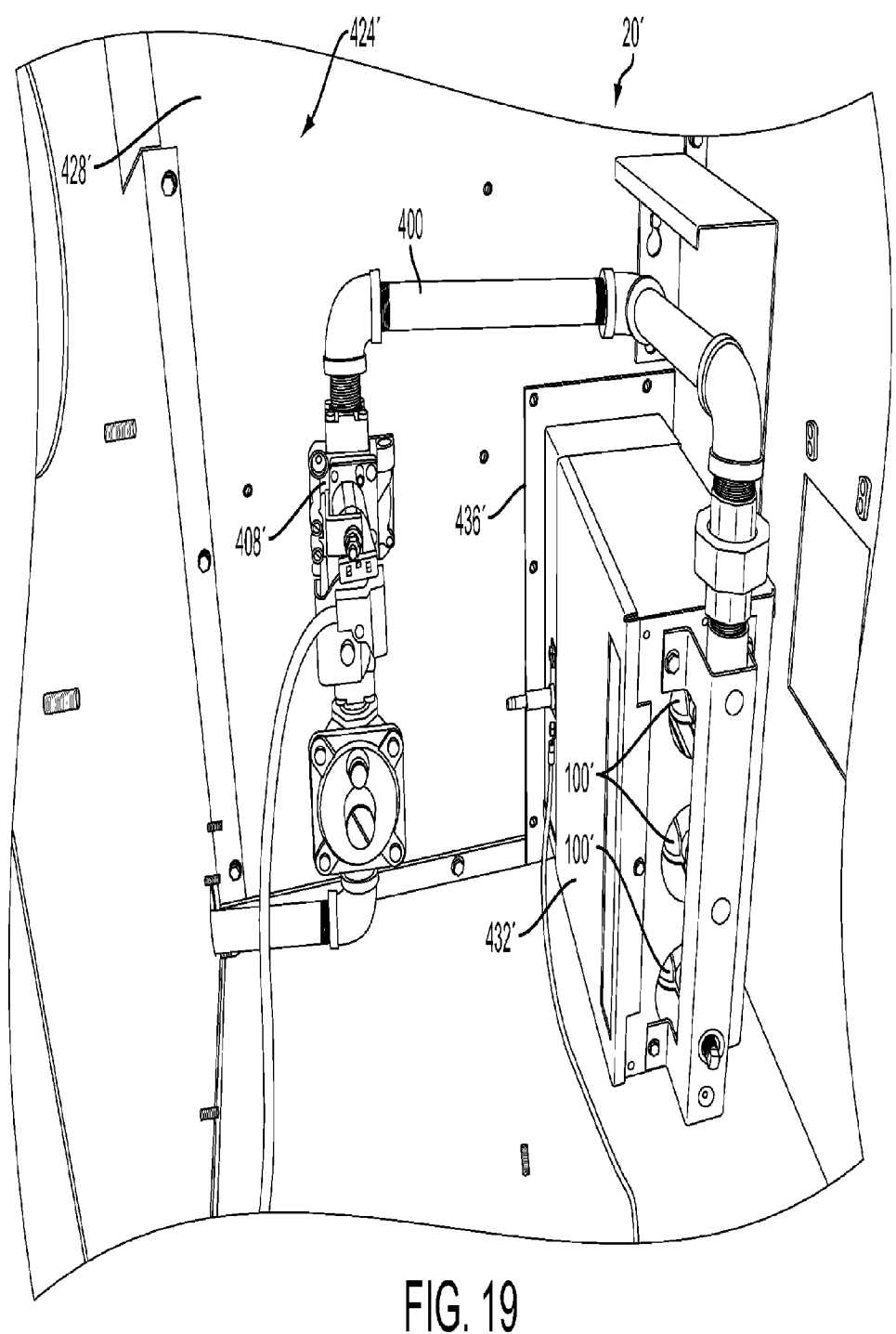
FIG. 19 is a perspective view of the burner compartment of the conveyor oven of FIGS. 16-18, shown with a fuel delivery system installed therein.
Figure 20:
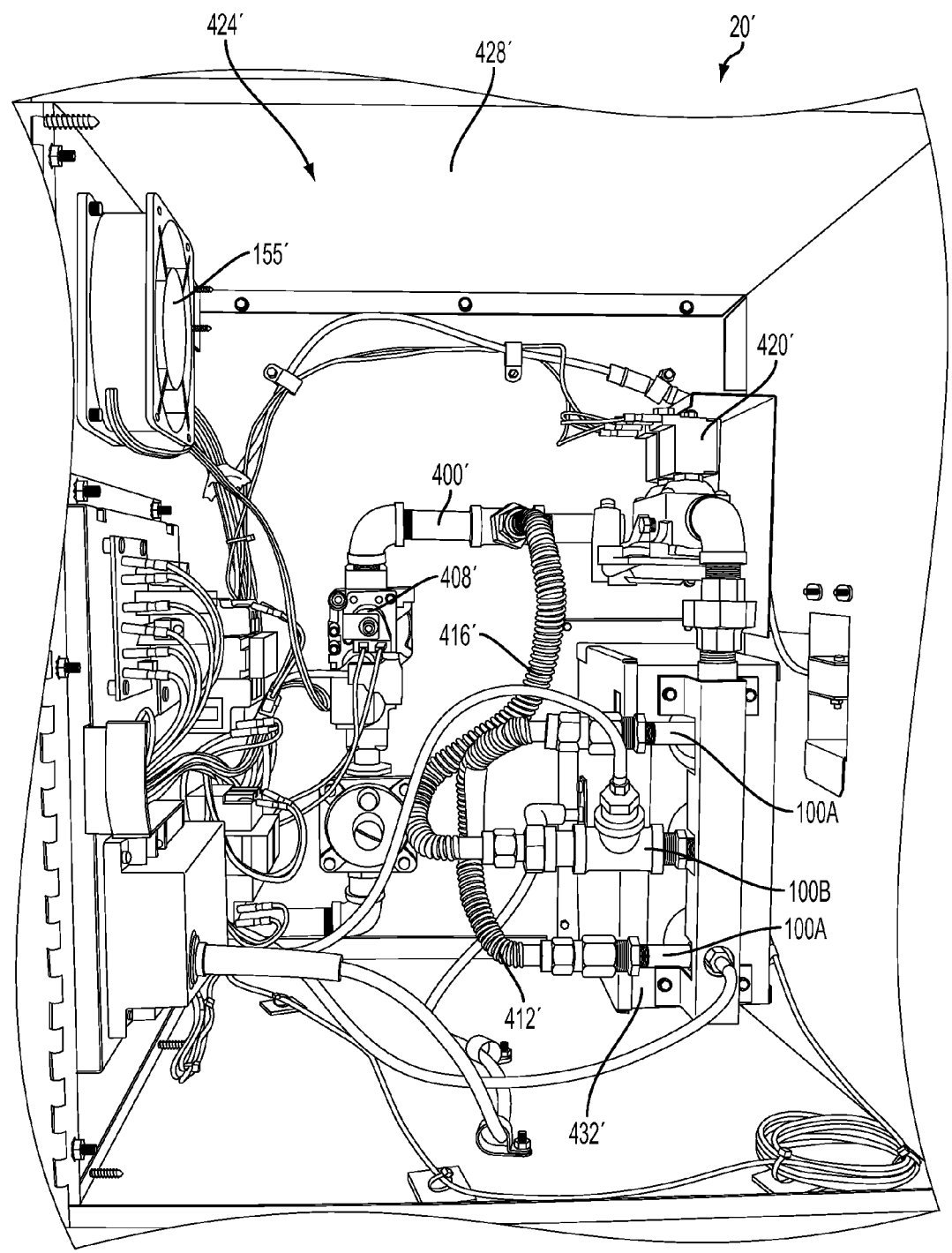
FIG. 20 is a perspective view of the burner compartment of the conveyor oven of FIGS. 16-19, shown with another fuel delivery system installed therein.

FIG. 16 illustrates a schematic example of a layout of components in an embodiment of the conveyor oven 20'. With reference to FIG. 16, main blowers 72', 74' draw air from an air return 422', and direct the air into a plenum 70' (see flow paths indicated with the letter A). The air is heated in the air return 422' by one or more flame tubes 130', is then forced into the plenum 70' by the main blowers 72', 74', and is then directed into the conveyor oven tunnel 24' through metal fingers 78' due to the increased air pressure in the plenum 70' caused by the main blowers 72', 74'. Upper and lower metal fingers 78' extend above and below the conveyor 22' in the tunnel 24'.

The illustrated conveyor oven 20' also includes a burner compartment 424' adjacent the plenum 70' and the air return 422'. The illustrated burner compartment 424' is separated from the plenum 70' and the air return 422' by a dividing wall 428', and includes a burner box 432' to house the burners 100' of the heat producing system (described above). The burner compartment 424' may also contain electronics, such as wiring, for the heat producing system, in addition to at least a portion of the fuel delivery system 400, 400' (see FIGS. 19 and 20).

In the illustrated embodiment of FIGS. 16-20, the dividing wall 428' includes an aperture 436', through which one or more flame tubes 130' (e.g., one corresponding to each burner 100') pass to provide heat to the air return 422'. The flames of each burner 100' are generally directed into a corresponding flame tube 130' to heat the air within the air return 422'.

With continued reference to the illustrated embodiment of FIGS. 16-20, the conveyor oven 20' also includes a combustion blower 155'. The combustion blower 155' generally directs air into the burner compartment 424', causing an increased pressure therein. As such, air is forced through the burner box 432' and through the flame tubes 130' to the air return 422' (see flow paths indicated with the letter B). This air flow is caused by a combination of the low pressure in the air return 422' resulting from the main blowers 72', 74' in at least some operating conditions of the main blowers 72', 74', as well as from high pressure within the burner compartment 424' resulting from the combustion blower 155'. As such, the main and combustion blowers 42', 44', 155' can compensate for one another to produce the required airflow to maintain the flames 64', 66' of the burners 100'.

FIGS. 21-24 illustrate an alternative embodiment of the conveyor oven 20" according to the present invention. In the embodiment of FIGS. 21-24, the conveyor oven 20" employs much of the same structure and has many of the same properties as the previously-described conveyor oven 20' shown in FIGS. 16-20. Accordingly, common elements have been given the same reference number with a double prime (") indicator. The following description of the conveyor oven 20" focuses primarily upon structure and features different than the previously-described embodiments. Reference is made to the description of the conveyor oven 20' above for details of the structures and operation, as well as alternatives to the structures and operation, of the conveyor oven 20" not specifically discussed herein.

Figure 21:
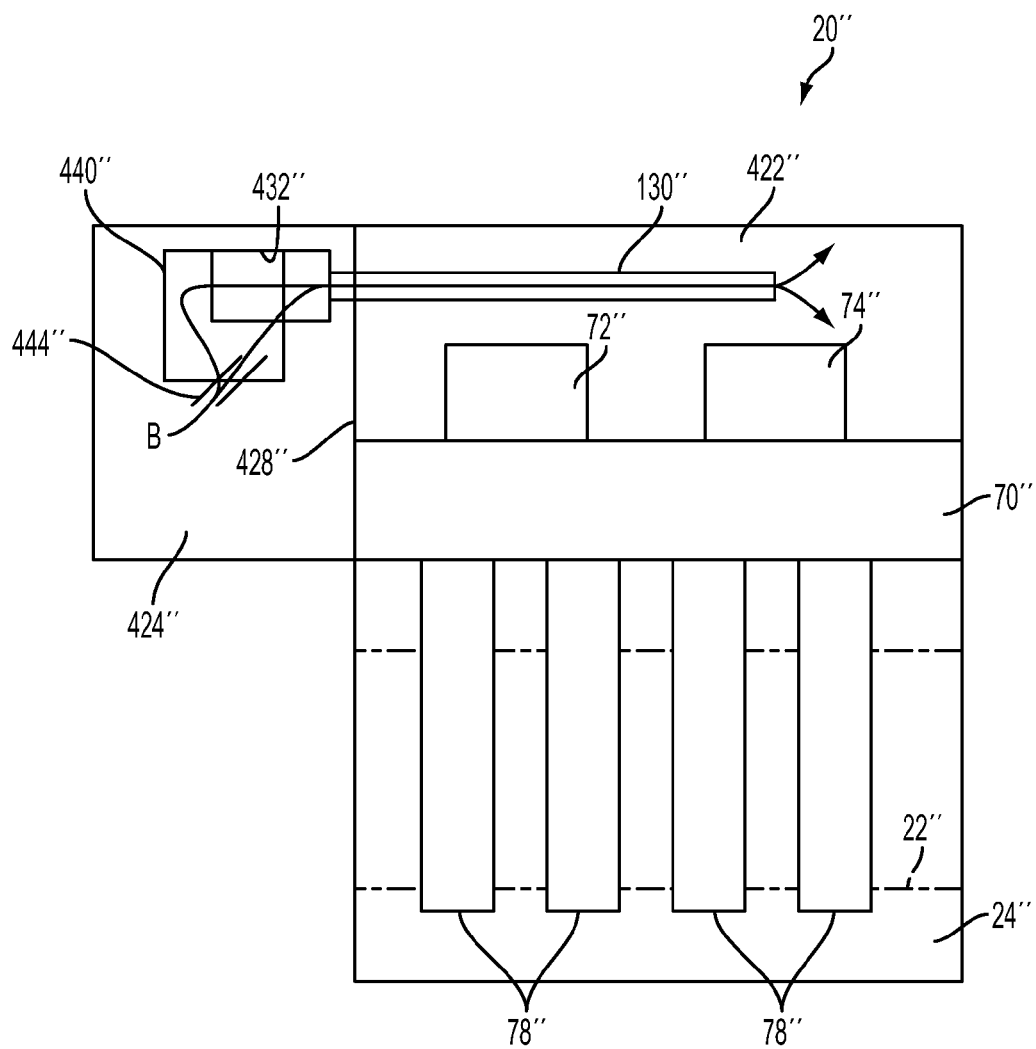
FIG. 21 is a plan view of another embodiment of a conveyor oven according to the present invention.
Figure 22:
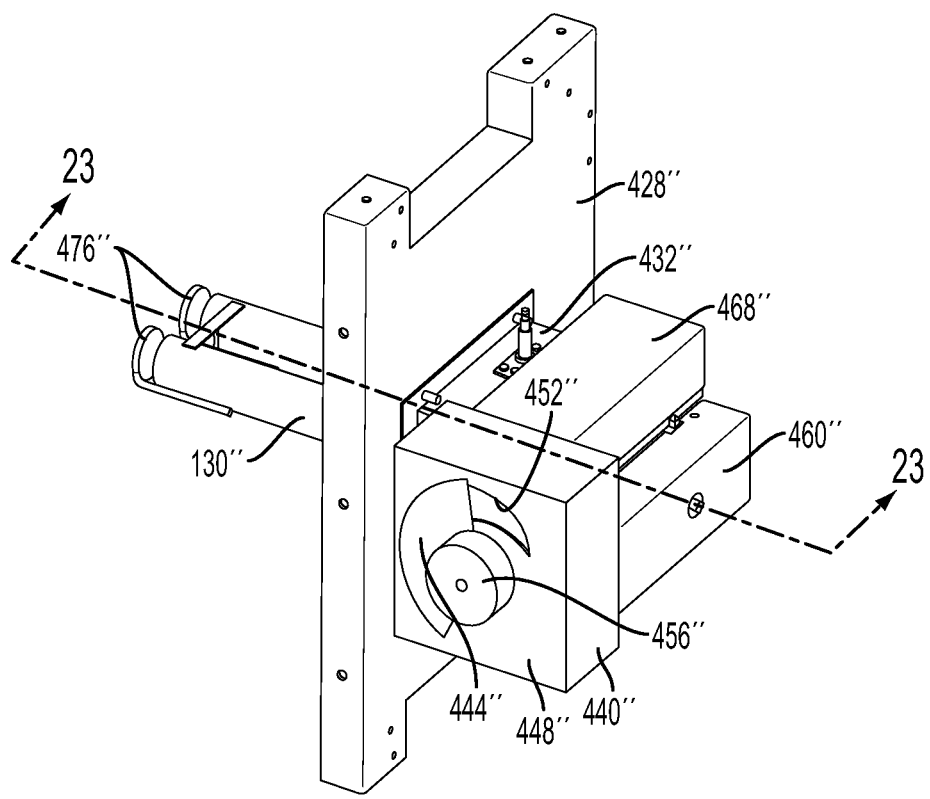
FIG. 22 is a perspective view of a burner box with an air control system attached.

FIG. 21 illustrates a schematic example of a layout of components in an embodiment of the conveyor oven 20". With reference to FIG. 22, the burner box 432" includes an air control system 440" to control the flow of air through the burner box 432" (e.g., the gas burner airflow rate, see flow B of FIG. 21). The air control system 440" includes a damper or throttle body 444" variable between a first configuration where air is allowed to flow freely therethrough and a second configuration where the flow of air is at least partially restricted. In some embodiments, the damper 444" may also include one or more intermediate configurations therebetween in which two or more air flow rates through the damper 444" are permitted. In some embodiments, the range of air flow rates can be continuously adjustable by movement of the damper 444" (e.g., as is possible based upon the shape of the aperture 452" shown by way of example on FIG. 22), or can instead be set to a limited number of discrete settings corresponding to different air flow rates. In the illustrated embodiment, the damper 444" includes a damper box 448" defining the aperture 452" that may be adjustably blocked by a rotary damper actuator 456".

The illustrated air control system 440" also includes a primary air duct 460" providing fluid communication between the damper 444" and a primary air inlet 464" of the burner box 432", thereby allowing air to flow therebetween. In the illustrated embodiment, the primary inlet 464" is positioned proximate the throat end of the burners 100 (see FIG. 24) such that the air passing therethrough is mixed with fuel from the fuel delivery system 400 and at least partially passes through at least one of the burners 100" for combustion.

Figure 23:
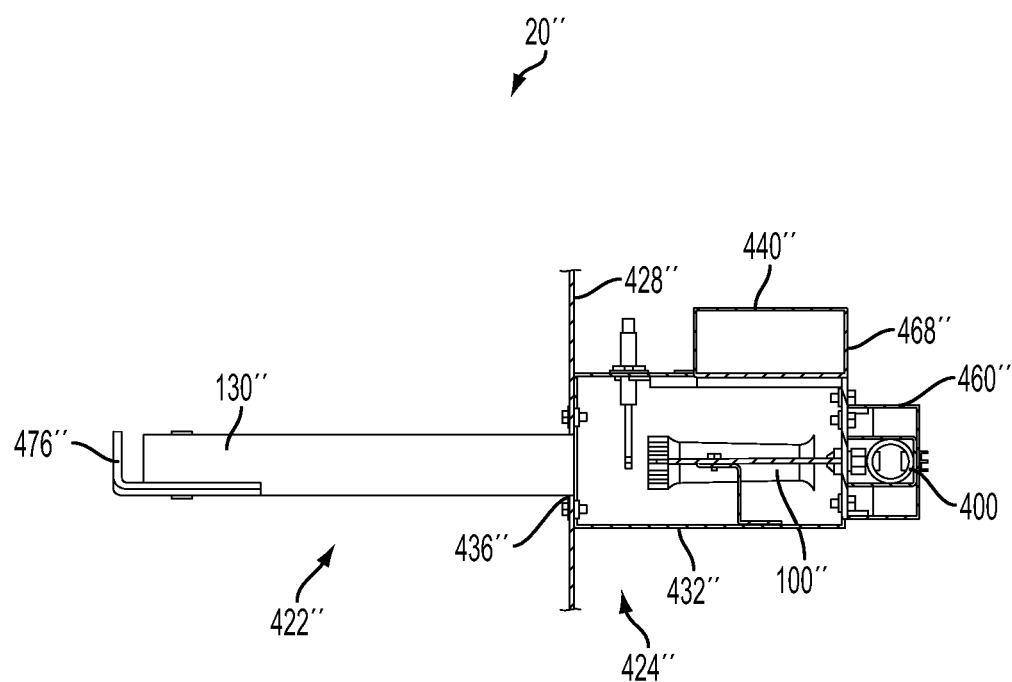
FIG. 23 is a section view taken along lines 23-23 of FIG. 22.
Figure 24:
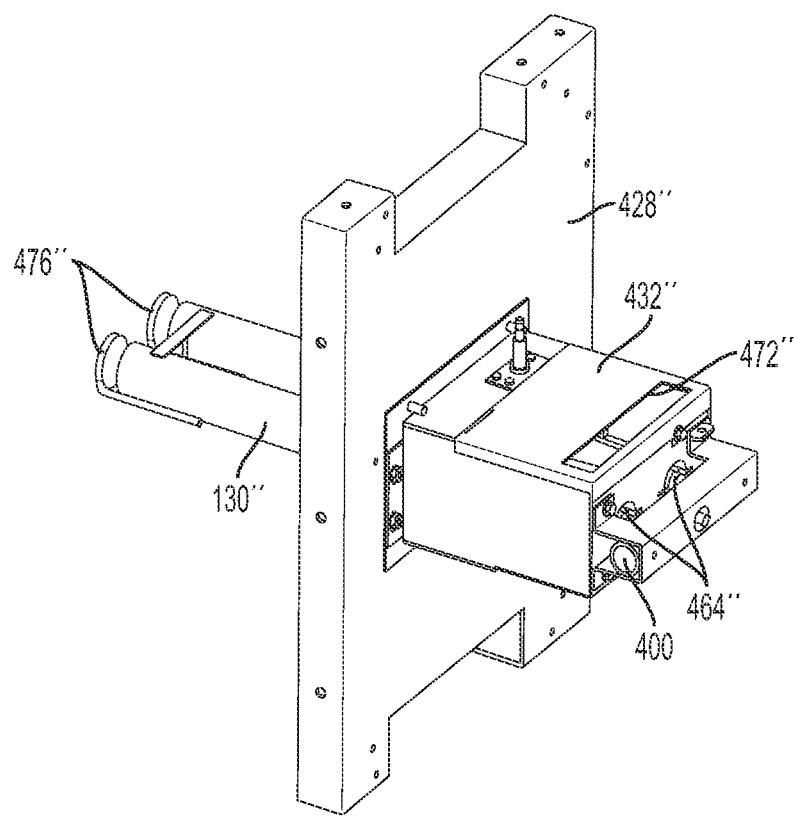
FIG. 24 is a perspective view of the burner box of FIG. 22, shown with the air control system removed for clarity.

The air control system 440" of FIGS. 22-24 also includes a secondary air duct 468" providing fluid communication between the damper 444" and a secondary air inlet 472" of the burner box 432", thereby allowing air to flow therebetween. In the illustrated embodiment, the secondary air inlet 472" is a rectangular opening at the top of the box 432" such that air flowing therethrough enters the top of the burner box 234" adjacent the burners 100 to provide additional oxygen for complete combustion of the fuel.

Although the air control system 440" illustrated in FIGS. 22-24 has a single damper 444" in communication with primary and secondary air ducts 460", 468", in alternate embodiments each air duct 460", 468" can have a respective damper (not shown), which in some cases can enable independent control of air to primary and secondary air inlets 464", 472". In still other embodiments, additional air ducts and/or dampers may be present as necessary, in which cases any air inlet 464", 472" can have air supplied thereto by one or more shared or independent air ducts 460", 468" having one or more shared or independent dampers. In still other constructions, at least one of the inlets 464", 472" may be open to the surrounding atmosphere without being in communication with a damper 444".

The illustrated air control system 440" also includes a set of targets 476" each coupled to and positioned proximate the end of a respective flame tube 130". The targets 476" are spaced a distance from the flame tubes 130" to restrict the flow of flue gasses from the tubes 130" during operation of the conveyor oven 20". In some embodiments, the gap between each target 476" and its corresponding flame tube 130" may be adjusted to provide an appropriate amount of flow resistance.

In use of the conveyor oven 20" the illustrated damper 444" can be variable between cooking and energy savings modes to at least partially adjust the flow of air therethrough (e.g., the gas burner airflow rate). For example, when the damper 444" is used in combination with adjustable main blowers 42", 44", which blowers are capable of producing a suction force in excess of the amount necessary to properly operate the burners 100", the damper 444" can be placed in the second configuration when the conveyor oven 20" is in the cooking mode, and can be variable to the first configuration when the conveyor oven 20" is in the energy saving mode. As such, during the cooking mode the damper 444" can at least partially restrict the flow of air through the damper 444" and into the burner box 432" to a level suitable for maintaining the flames in each burner 100". The damper 444" can be placed in the first configuration during the energy saving mode to reduce the resistance to the airflow through the damper 444", and to allow air to flow freely into the burner box 432". This change can be performed in combination with a reduction in operation speed of the main blowers 42", 44" to compensate for loss in suction as a result of the lower main blower speeds. Therefore, the operating speed of the main blowers 42", 44" can be reduced during the energy saving mode while the gas burner airflow rate remains sufficiently high to maintain the flames of the burners 100".

In contrast, when the damper 444" is used with constant speed main blowers 42", 44", the damper 444" can be placed in the first configuration during the cooking mode, and can be adjustable to the second configuration during the energy savings mode. Since the draw or suction of the blowers 42", 44" is constant in both the cooking and energy saving modes, the increased resistance from the closed damper 444" reduces the gas burner airflow rate in the energy savings mode to correspond to a reduced flame in the burners 100.

The embodiments described above and illustrated in the figures are presented by way of example only, and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims. For example, although a specific type of burner is described above in connection with ovens according to the present invention, the invention can be applied to any type of gas burner system having other types of burners. As another example, the conveyor oven 20 can have any number of combustion blowers 155 corresponding to any number of burners 100, 150, and can have any number of main blower fans 72, 74, all of which can be located anywhere in the oven 20. In such embodiments, the CPU 650 can control operation of the gas burners 100, 150, the combustion blowers 155, and/or the blower fans 72, 74 independently with respect to one another or with respect to other components of the conveyor oven 20, or otherwise.

What is claimed is:

1. A conveyor oven comprising:
    an oven chamber in which food is cooked;
    a conveyor moveable to convey the food through the oven chamber;
    a gas burner to generate heat for the oven chamber, wherein the gas burner has a variable heat output and a combustion airflow rate;
    a main blower for circulating air within the oven chamber, wherein the main blower has variable speeds and operates at a first speed when food is present in the oven chamber;
    a combustion blower that provides air to the gas burner, wherein the combustion blower has variable speeds;
    a sensor to detect at least one of a temperature within the oven and the presence of food product upon the conveyor; and
    a controller that
        controls the variable heat output and combustion airflow rate of the gas burner, and
        controls the speeds of the main blower and combustion blower, wherein the controller is responsive to the detection of the absence of food from the oven chamber based at least in part upon operation of the sensor and, in response to the detection of the absence of food from the oven chamber, the controller (i) reduces the speed of the main blower from the first speed to a second slower speed, (ii) activates or increases the speed of the combustion blower, and (iii) maintains the oven at a set-point temperature by varying the heat output of the gas burner, and (iv) increases the speed of the main blower from the second speed to the first speed in response to detecting the presence of food on the conveyor upstream from the oven chamber.

2. The conveyor oven of claim 1, wherein the controller reduces the speed of the main blower from the second speed to a third slower speed or turns the main blower off when the combustion blower is activated.

3. The conveyor oven of claim 1, wherein the controller decreases the speed of the combustion blower or turns the combustion blower off when food is present in the oven chamber.

4. The conveyor oven of claim 1, wherein the controller increases the speed of the main blower to the first speed in response to a signal received from the sensor.

5. The conveyor oven of claim 1, wherein the sensor detects a temperature in the oven.

6. The conveyor oven of claim 5, wherein the controller increases the speed of the main blower to the first speed in response to a signal received from the sensor.

7. The conveyor oven of claim 1, wherein the sensor detects both a temperature in the oven and the presence of food product on the conveyor.

8. The conveyor oven of claim 1, wherein the controller turns the main blower off when the combustion airflow rate exceeds a predetermined minimum.

* * * * *